(12) United States Patent
Gerth et al.

(10) Patent No.: US 12,459,204 B2
(45) Date of Patent: Nov. 4, 2025

(54) ADJUSTING A POSITION OF ARTIFICIAL TEETH OF A DENTURE

(71) Applicant: EXOCAD GMBH, Darmstadt (DE)

(72) Inventors: Maik Gerth, Darmstadt (DE); Paul Schnitzspan, Darmstadt (DE); Grigorios Karangelis, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 1100 days.

(21) Appl. No.: 17/463,641

(22) Filed: Sep. 1, 2021

(65) Prior Publication Data
US 2023/0069231 A1  Mar. 2, 2023

(51) Int. Cl.
| | |
|---|---|
| *B29C 64/386* | (2017.01) |
| *A61C 9/00* | (2006.01) |
| *A61C 13/00* | (2006.01) |
| *A61C 13/01* | (2006.01) |
| *B33Y 50/00* | (2015.01) |
| *G06T 19/20* | (2011.01) |
| *B29L 31/00* | (2006.01) |

(52) U.S. Cl.
CPC ............ *B29C 64/386* (2017.08); *A61C 9/004* (2013.01); *A61C 13/0004* (2013.01); *A61C 13/0019* (2013.01); *A61C 13/01* (2013.01); *B33Y 50/00* (2014.12); *G06T 19/20* (2013.01); *B29L 2031/753* (2013.01); *G06T 2219/2004* (2013.01); *G06T 2219/2016* (2013.01)

(58) Field of Classification Search
CPC ....... G06F 30/00; B29C 64/386; A61C 9/004; A61C 13/0004; A61C 13/0019; A61C 13/01; A61C 13/10; B33Y 50/00; B33Y 80/00; G06T 19/20; G06T 2219/2004; G06T 2219/2016; B29L 2031/753

USPC ......................................................... 703/6, 1
See application file for complete search history.

(56) References Cited

U.S. PATENT DOCUMENTS

| | | | |
|---|---|---|---|
| 7,590,462 B2 * | 9/2009 | Rubbert | G06T 17/00 700/118 |
| 12,133,710 B2 * | 11/2024 | Saphier | A61B 5/0033 |
| 2016/0135931 A1 * | 5/2016 | Morales | A61C 8/0048 433/213 |

(Continued)

FOREIGN PATENT DOCUMENTS

| | | | | |
|---|---|---|---|---|
| EP | 3275397 A1 | 1/2018 | | |
| WO | WO-2012113407 A1 * | 8/2012 | ......... | A61C 13/0004 |

(Continued)

*Primary Examiner* — Cedric Johnson
(74) *Attorney, Agent, or Firm* — PERRY + CURRIER INC.

(57) ABSTRACT

The invention relates to a computer-implemented method for adjusting a position of artificial teeth of a denture. A digital 3D model of the denture comprising at least a denture part is provided. The denture part is configured for a jaw of a patient and comprises a dental arch with a plurality of artificial teeth arranged in an artificial gingiva. A deformable gingiva section of the artificial gingiva is defined between the teeth of the plurality of artificial teeth and a fixed gingiva section of the artificial gingiva with a fixed geometrical form. The dental arch is moved as a whole relative to the fixed gingiva section in order to adjust the position of the dental arch. A geometrical form of the deformable gingiva section is deformed due to the moving of the dental arch, whereas the fixed gingiva section maintains the fixed geometrical form.

48 Claims, 9 Drawing Sheets

(56) References Cited

U.S. PATENT DOCUMENTS

2019/0159863 A1    5/2019  Fisker et al.
2022/0168078 A1*   6/2022  Klingenburg .......... A61C 19/05

FOREIGN PATENT DOCUMENTS

WO    WO-2013120955 A1    8/2013
WO    WO-2022174165 A1    8/2022

* cited by examiner

ADJUSTING A POSITION OF ARTIFICIAL TEETH OF A DENTURE

The invention relates to the field of dental technology. More particularly, the invention relates to a computer-implemented method for adjusting a position of artificial teeth of a denture. The invention furthermore relates to a computer system and a computer program product for adjusting a position of artificial teeth of a denture.

Dentures are prosthetic devices used to replace missing teeth of a patient. They are supported by the surrounding soft and hard tissues of the oral cavity of the patient. A denture may have to meet several requirements: the fit on the supporting tissue should be comfortable and tight; the occlusion of artificial teeth provided by the denture should be adjusted to the patient's individual stomatognathic system; the denture should ensure suitable phonetic capabilities, i.e., the patient should be able to speak clearly; finally, the appearance of the dentures should be satisfying. Thus, a denture may be required to be satisfying mechanically, phonetically as well as aesthetically. However, individual physiological preconditions may differ from patient to patient. They may even differ significantly. Therefore, it is necessary to adjust a denture to the individual requirements of the individual patient for whom the respective denture is intended.

It is an objective to provide for a computer-implemented method, a computer system and computer program product for adjusting a position of artificial teeth of a denture.

In one aspect, the invention relates to a computer-implemented method for adjusting a position of artificial teeth of a denture. The adjusting of the position of the first dental arch of the denture comprises providing a digital 3D model of the denture comprising at least a first denture part. The first denture part is configured for a first jaw of a patient. The first denture part comprises a first dental arch. The first dental arch comprises a first plurality of artificial teeth to be adjusted. The first plurality of artificial teeth is arranged in a first artificial gingiva. A first deformable gingiva section of the first artificial gingiva with a first deformable geometrical form is defined. The first deformable gingiva section is located between the teeth of the first plurality of artificial teeth and a first fixed gingiva section of the first artificial gingiva with a first fixed geometrical form. The first dental arch is moved as a whole relative to the first fixed gingiva section in order to adjust the position of the first dental arch with the teeth of the first plurality of artificial teeth maintaining fixed positions relative to each other. The first deformable geometrical form of the first deformable gingiva section is deformed due to the moving of the first dental arch, whereas the first fixed gingiva section maintains the first fixed geometrical form.

The denture may, e.g., comprise a denture part configured as a removable appliance used for prosthetically replacing a complete dental arch, i.e., all teeth within a jaw. The denture may be a complete denture, i.e., a removable appliance comprising two parts, each of which is configured for prosthetically replacing a complete dental arch, i.e., all teeth within a jaw. Thus, the denture may, e.g., comprise one or two denture parts, each of which is replacing a dental arch. The denture may comprise a mandibular denture part and/or a maxillary denture part. A mandibular denture part comprises a mandibular dental arch, which replaces missing natural teeth on the patient's mandibular dental arch. A maxillary denture part comprises a maxillary dental arch, which replaces missing natural teeth on the patient's maxillary dental arch.

Computer-aided design (CAD) may be used for generating, modifying, analyzing, and/or optimizing the digital 3D models of the denture and the objects comprised by the denture, like an artificial gingiva and artificial teeth. The digital 3D models may define geometrical forms of objects, e.g., surfaces of those 3D objects. Furthermore, for manufacturing physical copies of the digital 3D models defined using CAD computer-aided manufacturing (CAM) may be used to control manufacturing devices, e.g., machining devices and/or 3D printing devices, to manufacture the physical copies as defined by the digital 3D models.

A digital 3D model of a denture, i.e., a digital denture, may be provided. The digital denture may be generated from scratch. For example, scan data of tissues of an oral cavity of a patient may be provided. The scan data may define the geometrical structure of hard and soft tissues of the patient's oral cavity providing support for the denture. The respective scan data may be acquired by using a scanner, e.g., an optical scanner. The scan may be a direct scan of the patient's oral cavity, e.g., an intraoral scan. The scan may be an indirect scan of tissues of the patient's oral cavity. For example, an impression of the patient's hard and soft oral tissues or a model of the geometric structure of the respective tissues, like a plaster cast model, may be scanned. Such an impression provides a negative form of the geometric structure of the respective tissues. A model may provide a positive form of the geometric structure of the respective tissues. The scan data may define the patient's intraoral support structure available for supporting the denture to be provided. In addition, the scan data may comprise position data defining a relative position of the patient's maxillary and mandibular intraoral support structures for the denture. The support structures may, e.g., comprise an edentulous maxillary and/or an edentulous mandibular arch, also referred to as maxillary and mandibular ridge, respectively.

For generating the digital 3D model of the denture, e.g., a digital 3D model of the patient's maxillary and mandibular intraoral support structures may be provided using the scan data. On these support structures a digital 3D model of an artificial gingiva of the denture may be arranged, which provides a denture base for the artificial teeth of the denture. The denture base may comprise a support surface configured to be placed on the intraoral tissues supporting the denture. The geometrical form of the support surface may be defined by the geometrical form of the tissues supporting the denture. Within the artificial gingiva a plurality of digital 3D models of artificial teeth may be arranged forming a dental arch. A denture may comprise one or two denture parts, i.e., a maxillary and/or a mandibular denture part. Each of these denture parts may comprise an artificial gingiva with a dental arch comprising a plurality of artificial teeth arranged therein. The artificial gingiva of the maxillary denture part may comprise a maxillary support surface defined by the geometrical form of the maxillary tissues supporting the maxillary denture part. The artificial gingiva of the mandibular denture part may comprise a mandibular support surface defined by the geometrical form of the mandibular tissues supporting the mandibular denture part.

The artificial gingiva of a denture part of the denture may be designed from scratch using computer-added design (CAD) tools. Alternatively, the artificial gingiva may be selected from a gingiva library comprising a plurality of pre-defined digital 3D models of artificial gingivas. The respective digital models may differ from each other with regard of their geometrical form, their surface structure and/or their surface color. In case an artificial gingiva model is selected from a gingiva library, the selected model may be automatically, semiautomatically or manually adjusted to the patient's intraoral support structure as defined by the scan data. For example, the geometry of the support surface of the selected gingiva model and/or the dimensions of the selected gingiva model may be adjusted to the individual intraoral structure of the patient as defined by the scan data.

The artificial teeth arranged within the artificial gingiva may be designed from scratch using computer-added design (CAD) tools. Alternatively, the artificial teeth arranged within the artificial gingiva may be selected from a tooth library. The tooth library may provide a plurality of sets of teeth. Each of these sets of teeth may differ from each other regarding the geometry, relative size, surface structure and/or color of the teeth comprised. The artificial gingiva may for example comprise a plurality of pre-defined recesses defining the positions of the artificial teeth, at which the artificial teeth are arranged within the artificial gingiva. The recesses may further define orientations of the artificial teeth arranged therein. The artificial teeth may be arranged at the pre-defined positions. The position and/or orientation of the artificial teeth may be adjusted, if necessary. Furthermore, the teeth may be adjusted to individual requirements of the patient's intraoral situation. For example, the size of the teeth may be adjusted. Furthermore, other features of the teeth may be adjusted, like, e.g., geometry, surface structure, and/or color of the teeth.

For example, the method may further comprise acquiring the scan data using one or more scanners. For acquiring the scan data, a direct and/or indirect scan of the patient's intraoral structure may be used. Thus, the scan data may resemble the current state of the intraoral structure of the patient. The denture model may be generated by the computer system, which is also used for adjusting the position of the teeth, or it may be received by this computer system from an external source. The external source may, e.g., be a server, like a cloud server, providing the denture model via a network. The external source may, e.g., be a removable storage device providing the denture model via a direct communication connection between the removable storage device and the respective computer system. The denture model provided may, e.g., be the result of a CAD process generating a patient individual denture model. The respective denture model may, e.g., be the result of one or more adjustment cycles comprising a manufacturing of a physical copy of the digital denture model, e.g., a try-in or a trial denture. The respective physical copy may be used to test the design of the denture by the patient and/or a dentist. Based on the test a feedback defining required adjustments of the denture model may be provided, according to which the digital denture model may be adjusted. The adjustment requirements may in particular define a required adjustment of the position of the artificial teeth of the denture.

A section of the artificial gingiva may be defined as a deformable gingiva section with a deformable geometrical form. Furthermore, the artificial gingiva may comprise a fixed gingiva section with a fixed geometrical form. The deformable gingiva section may be located between the artificial teeth and the fixed gingiva section. The deformable gingiva section may, e.g., be a pre-defined section of the artificial gingiva. Thus, the defining of the deformable gingiva section may be part of the providing of the digital 3D model of the denture, in case the digital 3D model of the denture provided comprises a definition of the deformable gingiva section. For example, a digital 3D model of an artificial gingiva may be selected from a gingiva library comprising a plurality of gingiva models with pre-defined deformable gingiva section. Thus, the gingiva model selected from a gingiva library may comprise a pre-defined deformable gingiva section. For example, definition of the deformable gingiva section provided may be adjusted to individual requirements of the patient. The adjusting may, e.g., be an automatic, semi-automatic or manual adjusting. For example, the artificial gingiva of the digital 3D model of the denture may comprise no definition of a deformable gingiva section. In this case, the deformable gingiva section may, e.g., be defined after the digital 3D model of the denture is provided.

The deformable gingiva section may be configured to be deformable, in case the dental arch is moved as a whole. By deforming the deformable gingiva section, the change of the position of the dental arch relative to the fixed gingiva section may be compensated. For example, the deformable gingiva section may comprise a common boundary with the fixed gingiva section and a boundary adjacent to the artificial teeth of the dental arch to be moved. The form and relative position of the boundary adjacent to the teeth of the dental arch may be fixed. The position of the common boundary within the fixed gingiva section as well as its form may be fixed as well. When moving the dental arch relative to the fixed gingiva section, the boundary adjacent to the teeth of the dental arch may be moved simultaneously with the dental arch maintaining its relative position to the dental arch as well as its form. The common boundary with the fixed gingiva section may remain unmoved and unaltered, i.e., form and position of the respective boundary may be maintained. This may have the effect, that the deformable geometrical form of the deformable gingiva section may be deformed due to the moving of the dental arch, wherein the fixed geometrical form of the fixed gingiva section may be maintained as well as the position of the fixed gingiva section. The fixed gingiva section may comprise the support surface of the artificial gingiva for supporting the denture on the support structure provided by the patient's intraoral tissues. In particular, the geometrical form of the support surface of the fixed gingiva section may be maintained. Furthermore, the fixed gingiva section may maintain a relative position to the support structure provided by the patient's intraoral tissues. Thus, the support surface of the fixed gingiva section may maintain a pre-defined position on or at the support structure provided by the patient's intraoral tissues.

This may have the beneficial effect, that while adjusting the position of the artificial teeth a fitting of the one or two support surfaces of the denture to the skin of the patient's remaining gum of one or two jaws, existing freeform modifications of the digital gingiva shape and/or freeform modifications of digital tooth shapes may be preserved. For example, the relative position and orientation of the digital teeth of the dental arch being moved are preferred. Thus, a digital denture design comprised by the denture model provided may be preserved. For example, a bite of upper and lower teeth relative to each other may be preserved. For example, an occlusion between the upper and lower teeth may be preserved. The selective deformation of the deformable gingiva section, while preserving the geometrical forms of the teeth as well as the fixed gingiva section, e.g., a Laplacian mesh deformation or an auto gingiva movement may be used.

The dental arch may be moved as a whole relative to the fixed gingiva section in order to adjust the position of the dental arch, while the teeth of the dental arch being moved maintain fixed positions relative to each other.

By adjusting the position of a dental arch relative to a fixed gingiva section of an artificial gingiva within which the dental arch is arranged, the position of the dental arch relative to a support surface of the denture provided by the fixed gingiva section may be adjusted. The adjusting of the position of the artificial teeth may, e.g., be used to adjust a position and/or orientation of an occlusal plane defined by the respective teeth. Such a movement of the teeth may, e.g., be performed for adjusting a bite height of the denture. For example, the artificial teeth may be moved without altering the occlusal plane, i.e., the artificial teeth may be moved within the occlusal plane. A movement of the teeth within the occlusal plane may, e.g., be performed in order to adjust a labial contour of the denture to a patient's facial structure. The labial contour of the denture may be defined labial surfaces of anterior artificial teeth, which provide support for the patient's lips. By adjusting the labial contour of the denture, the contour of the patient's lips may be adjusted. For example, the position of the fixed gingiva section may be defined by a central position of the patient's jaws. The central position may be defined as the position of the patient's mandibular jaw in a retruded unstrained relation to the maxillary jaw. For example, the scan data may provide data defining the central position of the patient's jaws.

For example, a try-in or a trial denture may have been manufactured for patient using the denture model and a feedback provided based on the result of the trial may state that a bite line of the denture is too low or too high. For example, the patient's smile or bite, when wearing the denture, may not be correct. The try-in or trial denture may be tested regarding it's mechanical, phonetical as well as aesthetical features. The trial may comprise testing the fit of the denture on the supporting. It may be tested, whether the fit is comfortable and sufficiently tight. The occlusion of the artificial teeth provided by the denture may be tested and, if necessary, further adjusted to the patient's individual stomatognathic system. Furthermore; the denture may be tested, whether it ensure suitable phonetic capabilities of the patient, i.e., the patient should be able to speak clearly. Finally, the appearance of the denture may be checked.

In order to adjust the bit line, defined by the contact between the teeth of the maxillary and mandibular jaw, a maxillary and mandibula dental arch comprised by the denture may be moved. For example, the dental arches may be moved upwards or downwards relative to the reference frame defined by the scan data describing the geometry of the patient's intraoral structures. For example, the dental arches may be moved upwards or downwards relative to a central position of the patient's jaws as defined by the scan data or a digital 3D model of the patient's intraoral structure generated using the scan data. For example, the central position may be adjusted based the results of a trial of a try-in and/or a trial denture. The moving of the dental arches may comprise lateral movements and/or rotations in order to adjust the smile and/or bite of the denture.

For example, patients that did not have any teeth or at least any reasonably good teeth for a long period of time, like for years, do not necessarily know how far they need to open their mouth to feel comfortable. Therefore, those patients may have to try a denture to determine, what is actually comfortable. Often a required distance between remaining upper and lower gum and/or the position of the dental arch within a forward/backward direction relative to the remaining upper and lower gum may be unknown. The patients may, e.g., have grinded down their teeth, teeth may be missing and/or the patient's may even have orthodontic problems. Due to these reasons, patient's may have adjusted to a wrong bite over time. A trial may be used to determine a suitable bite for such a patient.

Moving the dental arch may not comprise moving the intraoral support structure defined by the scan data of the patient or the fixed gingiva section. The fixed gingiva section may for example comprise the support surface adjusted to the geometry of the scanned patient gum on of the patient's jaws. The move operation may only move the dental arch relative to the fixed gingiva section. For example, the dental arch may be moved away from the fixed gingiva section or towards the fixed gingiva section. The dental arch may be moved within a horizontal plane. The dental arch may, e.g., be rotated relative to the fixed gingiva section.

Parameters defining the adjustment of the position of the dental arch or arches may, e.g., comprise a type of movement, i.e., translation or rotation, a direction of the movement and/or a length of the movement. These parameters may, e.g., be the result of a trial of a try-in or trial denture. For example, a try-in denture may be arranged in the patient's mouth, where the dentist performs adjustments. These adjustments may, e.g., comprise adding or removing material, like wax material, of the try-in. In particular, the position of the teeth of the try-in denture may be adjusted. The adjusted try-in denture may be scanned. A geometric difference of the position and/or orientation of the teeth of the adjusted try-in denture defined by the scan data and the planned tooth setup, i.e., the position and/or orientation of the teeth of the digital 3D model of the denture, may define the required adjustments of the position of the teeth. In order to adjust the position of the teeth of the digital 3D model of the denture, they may be moved. The movement may comprise a translation and/or rotation.

For example, one or more 2D photos may be used to determine differences between a position of the teeth of an original try-in denture and an adjusted position of teeth of an adjusted try-in denture defining a desired position for the teeth of the denture.

For example, a physical or digital jaw motion device, like an articulator, may be used to test the denture. In case of a digital jaw motion device, the digital 3D denture model may be arranged within the digital jaw motion device and its compatibility with standardized and/or patient individual jaw motions may be tested. Patient individual jaw motions may, e.g., be recorded and the digital jaw motion device may be used to mimic these recorded motions. In case of a physical jaw motion device, a physical copy of the digital 3D denture model may be manufactured and arranged within the physical jaw motion device. Based on the test using the physical or digital jaw motion device a required adjustment of the position of the teeth of the denture may be determined.

A dental arch is a crescent arrangement of teeth. The two dental arches of the two jaws, the maxillary and the mandibular dental arch, constitute the dentition. In the normal condition, the maxillary dental arch may be larger than the mandibular dental arch, so that the teeth in the maxilla overlap the teeth of the mandible. The overlap may generally be an overlap in front as well as at the sides.

A denture may have a plurality of benefits. A denture may, e.g., be used to restore a natural appearance of a patient's face as it is provided by a natural appearance to the face. Furthermore, a loss of teeth may cause facial muscles on the cheeks and lips to lose their support. A denture may provide an artificial support for the lips and cheeks to mask the loss in muscular tone. A denture may help improving aesthetics of a patient. The support for the lips and cheeks and corrects the collapsed appearance that results from the loss of teeth. Thus, a collapsed appearance that results from the loss of teeth may be corrected. A loss of teeth may further cause a loss in masticatory, i.e., chewing efficiency. A denture may help to at least partially compensate this loss in masticatory by replacing edentulous areas with artificial teeth provided by the denture. Wearing a denture may further improve a patient's pronunciation, especially of words containing sibilants or fricatives.

Providing the digital 3D denture model may comprise acquiring intraoral scan data. For example, scan data of the patient's edentulous maxillary and mandibular arches may be acquired. Alternatively, impressions of the patient's edentulous maxillary and mandibular arches may be taken. Since the height of the ridge may vary throughout each individual arch, two sets of impressions may be taken, comprising primary impressions, also referred to as preliminary impressions, and a secondary impression, also referred to as master impressions. For taking the primary impressions stock trays may be used. Stock trays are preformed trays, e.g., made from metal or plastic. The primary impressions may be used to create a first simple physical model that represents the individual edentulous maxillary and mandibular arches of the patient's mouth. The model physical model may, e.g., be a plaster cast model. The resulting physical model may be used to create the secondary trays. The secondary trays, e.g., from acrylic or shellac, may have a shape that corresponds to the shape of the mucosa of the individual patient. The user-customized form of the secondary trays may ensure a uniform thickness of impression material throughout the trays, when taking secondary impressions. Providing the digital 3D denture model may comprise acquiring scan data of the secondary impressions. Alternatively or additionally, the secondary impressions may be used to create a more detailed and accurate second physical model of the patient's maxillary and mandibular ridges. The second physical model may, e.g., be a plaster cast model. Providing the digital 3D denture model may comprise acquiring scan data of the second physical model.

Providing the digital 3D denture model may further comprise acquiring scan data of a denture try-in model. The try-in model may, e.g., be a physical copy of the digital 3D denture model. The acquired scan data may, e.g., comprise scan data describing the position of the try-in model in the patient's mouth. In case the denture try-in model is a full denture comprising a maxillary and a mandibular denture part, the scan data may describe position and/or orientation of the teeth of the maxillary and mandibular denture part relative to each other. In case the denture try-in model is a partial denture comprising a maxillary or mandibular denture part, the scan data may describe position and/or orientation of the teeth of the respective maxillary or mandibular denture part relative to natural teeth of the patient.

For example, a 3D scan of the denture try-in model may take place in the patient's mouth, i.e., the scan data may be acquired using an intraoral scan. The scan data acquired may be used to determine an actual position and/or orientation of the digitally planned denture in the patient's mouth. For acquiring 3D scan data, e.g., an optical scanner, and X-ray scanner and/or a computed tomography scanner, like a dental cone beam computed tomography (CBCT) scanner, may be used. Additionally, opacity points may be added to the try-in denture in order to be able to exactly locate the try-in denture. The opacity points may be opaque for the radiation, e.g., X-rays, used for acquiring the scan data. In particular, the opacity points may be used to determine the position and/or orientation of the try-in denture in the patient's mouth relative to an intraoral structure of the patient, which are opaque for the respective radiation as well. The opacity points may, e.g., be used to exactly insert the digital 3D denture model, resembling the try-in denture, within a digital 3D representation of the patient's intraoral structure provided by the CAD software. The digital 3D representation of the patient's intraoral structure may be acquired by a scan of the patient's intraoral structure. For scanning the patient's intraoral structure, e.g., an optical scanner, and X-ray scanner and/or a computed tomography scanner, like a dental cone beam computed tomography (CBCT) scanner may be used. Furthermore, artificial intelligence (AI) capabilities may be used to decide on adjustments of the digital 3D denture model of the denture needed depending on the findings of the scan of the try-in model.

The AI capabilities may, e.g., comprise a trained machine learning model. Such a trained machine learning model may be provided for determining adjustments of the digital 3D model of the denture. The adjustments may, e.g., comprise adjusting a position and/or orientation of one or two dental arches comprised by the denture. The trained machine learning model may be configured for making a prediction of one or more adjustments of the denture. The digital 3D model of the denture may be provided as input to the trained machine learning model. The input may further comprise relative position and/or orientation data for the denture. The relative position and/or orientation data may, e.g., define a relative position and/or orientation between parts of the denture, like a maxillary and a mandibular denture part of the denture, when the denture is arranged in a patient's mouth. This relative position and/or orientation data may, e.g., be acquired in form of scan data of a try-in denture. Such scan data may, e.g., be acquired as described above. The relative position and/or orientation data may, e.g., define a relative position and/or orientation between a maxillary or mandibular denture part of the denture and natural teeth of the patient, when the denture is arranged in a patient's mouth. This relative position and/or orientation data may, e.g., be acquired in form of scan data of a try-in denture. Such scan data may, e.g., be acquired as described above. In response to the providing of the input, a prediction of one or more adjustments of the denture may be received from the trained machine learning model as an output. This output may be used for adjusting the denture, i.e., the digital 3D model of the denture accordingly.

In order to provide the trained machine learning model for determining adjustments of the digital 3D model of the denture, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a digital 3D model of a denture. Furthermore, each training input may further comprise relative position and/or orientation data for the denture of the respective training input. The relative position and/or orientation data may, e.g., define a relative position and/or orientation between a maxillary and a mandibular denture part of the denture of the respective training input, when the respective denture is arranged in a patient's mouth. This relative position and/or orientation data may, e.g., be acquired in form of scan data of a try-in denture. Such scan data may, e.g., be acquired as described above. The relative position and/or orientation data may, e.g., define a relative position and/or orientation between a maxillary or mandibular denture part of the denture of the respective training input and natural teeth of a patient, when the denture is arranged in a patient's mouth. This relative position and/or orientation data may, e.g., be acquired in form of scan data of a try-in denture. Such scan data may, e.g., be acquired as described above. Each training output may comprise definitions of one or more adjustments of the denture of the respective training input. The untrained machine-learning model is trained using the training data to provide the training output as a prediction of one or more adjustments of a denture in response to receiving the training input of the respective training dataset, thereby creating the trained model. The trained machine learning model may then be provided for making predictions of one or more adjustments of other dentures, like the digital 3D denture model of a denture described herein.

The term "machine learning" (ML) refers to a computer algorithm used to extract useful information from training data sets by building probabilistic models, which are referred to as machine learning models or predictive models, in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning model may, e.g., be a data structure or program such as a neural network, in particular a convolutional neural network, a support vector machine, a decision tree, a Bayesian network etc. The machine learning model may be adapted to predict an unmeasured value, e.g., an adjustment parameter of a denture from other, known values, e.g., a digital 3D model of the denture and/or relative position and/or orientation data for the respective denture. According to an example, the machine learning model is a deep learning model.

Furthermore, a vertical height may be determined on which the patient should be biting upon using the denture. This vertical height is referred to as occlusal vertical dimension (OVD). Determining the OVD may be particularly challenging in case of complete dentures with no existing occlusion as a reference. For example, a resting vertical dimension (RVD) may be determined. The RVD may be defined as a vertical dimension between a point on the maxilla and a point on the mandible of the patient, when the patient's muscles are at a relaxed position. The difference between OVD and RVD is referred to as freeway space (FWS), i.e., RVD−OVD=FWS. The FWS should, e.g., be within the range of 2 to 4 mm. In case of an edentulous patient, the OVD may, e.g., be determined indirectly using the measured RVD and allowing for an adequate FWS. The RVD may, e.g., be measured using a Willis gauge measuring the distance between a point on the patient's chin and a point underneath the patient's nose.

Record blocks with a block or rim of wax resting on a rigid base may be used to determine a vertical dimension of occlusion for the individual patient. The orientation of the occlusal plane may be adjusted using the record blocks. The orientation of the occlusal plane may be adjusted such that it extends parallel to both the ala-tragal line and the inter-pupillary line. The level of the occlusal plane may be adjusted, e.g., based on aesthetic requirements. For example, the amount of wax visible, when the patient's jaws are at rest, when the patient is smiling and/or when the patient is speaking may be adjusted. A more thorough assessment may, e.g., be performed by asking the patient to say a few sentences, while the amount of the record block being visible is observed. Furthermore, a buccal surface of the record block may be adjusted to ensure an adequate support for lip and cheek support. Furthermore, the midline, canine line and/or smile line may be determined. All the aforementioned parameters and their values determined using the record blocks may be provided to the computer system, e.g., as part of the scan data. For example, the record blocks after testing and adjusting may be scanned. The respective parameters and their values may be used to generate and/or adjust the digital 3D denture model.

Furthermore, based on the information acquired with a try-in or trial denture may be used to determine the fit, aesthetics and maxillomandibular relation of the denture defined by the digital 3D denture model. In particular, occlusal relationship, aesthetics, phonetics and/or patient comfort may be checked. For example, a wax try-in denture may be used for a first trial. In addition, a trial denture may be used for a subsequent trial.

For example, the first denture part is a maxillary or a mandibular denture part.

For example, the first deformable gingiva section connects the first fixed gingiva section with one or more first boundary lines arranged at fixed positions at the teeth of the first plurality of artificial teeth. The form and position of the first boundary lines relative to the teeth of the first plurality of artificial teeth are maintained, when moving the first dental arch.

This may have the beneficial effect that the deformable gingiva section may extend from the teeth to the fixed gingiva section. Thus, the deformable gingiva section may comprise the artificial gingiva around the respective teeth. The deformable gingiva section may, e.g., comprise cut-outs for the artificial teeth. The boundaries of the cut-outs may, e.g., be provided by the first boundary lines. For manufacturing the denture, recesses may be for receiving the artificial teeth may be added within the deformable gingiva section. The recesses may, e.g., be slightly larger than the cut-outs providing a clearance around the artificial teeth for adding an adhesive for permanently fixing the artificial teeth within the recesses.

The deformable gingiva section may, e.g., comprise recesses configured for receiving the artificial teeth. The boundaries of the recesses may, e.g., be provided by the first boundary lines. The recesses may, e.g., be slightly larger than the tooth sections they are receiving, thus providing a clearance around the artificial teeth for adding an adhesive for permanently fixing the artificial teeth within the recesses.

For example, the first deformable gingiva section is in contact with the teeth of the first plurality of artificial teeth. Each of the first boundary lines defines a first contact line extending around one of the teeth of the first plurality of artificial teeth. The boundary lines may be boundary lines of the artificial gingiva defining cut-outs for the artificial teeth. For example, the cut-outs may have the form of the tooth sections which they are receiving.

For example, the one or more first boundary lines are arranged spaced apart from the teeth of the first plurality of artificial teeth and defines a clearance around each of the teeth of the first plurality of artificial teeth.

The boundary lines may be boundary lines of the artificial gingiva defining recesses for receiving the artificial teeth. For example, the recesses may, e.g., be slightly larger than the tooth sections they are receiving. Thus, each of the recesses may provide a clearance around the tooth it receives may provide a space for an adhesive used for establishing a fixed connection between the artificial gingiva and the artificial teeth.

For example, manufacturing the first denture part may comprise manufacturing the artificial gingiva providing a base of the denture part, as well as a first plurality of artificial teeth. The artificial gingiva may comprise a recess for each of the teeth of the first plurality of artificial teeth defining a position and orientation for the respective tooth. In order to permanently connect the artificial gingiva and the artificial teeth, an adhesive may be added to the respective recesses and the teeth may be arranged within the recesses. When the adhesive is hardened, a permanent connection between the artificial gingiva and the artificial teeth may be established.

For example, the first deformable gingiva section connects the first fixed gingiva section with a first boundary gingiva section of the first gingiva. The first boundary gingiva section extends around teeth of the first plurality of artificial teeth. The first connection gingiva section is moved together with the first dental arch. The first connection gingiva section maintains a fixed third geometrical form and a fixed position relative to the teeth of the first plurality of artificial teeth.

The boundary section may define a section of the artificial gingiva around the teeth of the dental arch being moved. The respective boundary gingiva section comprises a fixed geometrical form which is maintained, when moving the dental arch. Thus, for example the relative position of the boundary gingiva section to the dental arch is maintained, when moving the dental arch. In other words, the boundary section of the gingiva may be moved together with the dental arch, i.e., the same translations and/or rotations which are applied to the dental arch, may be applied to the boundary gingiva section. For example, only the deformable geometrical form of the deformable gingiva section is deformed due to the movement of the dental arch in combination with the boundary gingiva section.

This may have been the beneficial effect that the geometrical form of the artificial gingiva around the teeth of the dental arch being moved, i.e., the fixed geometrical form of the boundary gingiva section, is maintained independently of the positioning of the dental arch. Thus, the design of the artificial gingiva around the artificial teeth as well as any design adjustments of the artificial gingiva in view of the artificial teeth is preserved.

For example, the first boundary gingiva section is in contact with the teeth of the first plurality of artificial teeth. The first boundary gingiva section connects the teeth of the first plurality of artificial teeth, which are arranged within the first connection gingiva section, with the first deformable gingiva section. The contact lines may be boundary lines of the artificial gingiva defining cut-outs for the artificial teeth. For example, the cut-outs may have the form of the tooth sections which they are receiving.

For example, the first boundary gingiva section is spaced apart from the teeth of the first plurality of artificial teeth and defines a clearance around each of the teeth of the first plurality of artificial teeth.

The clearances may be provided by recesses arranged within the boundary gingiva section for receiving the artificial teeth. For example, the recesses may, e.g., be slightly larger than the tooth sections they are receiving. Thus, each of the recesses may provide a clearance around the tooth it receives may provide a space for an adhesive used for establishing a fixed connection between the artificial gingiva and the artificial teeth.

For example, manufacturing the first denture part may comprise manufacturing the artificial gingiva providing a base of the denture part, as well as a first plurality of artificial teeth. The artificial gingiva may comprise a recess for each of the teeth of the first plurality of artificial teeth defining a position and orientation for the respective tooth. In order to permanently connect the artificial gingiva and the artificial teeth, an adhesive may be added to the respective recesses and the teeth may be arranged within the recesses. When the adhesive is hardened, a permanent connection between the artificial gingiva and the artificial teeth may be established.

For example, the first boundary gingiva section may form a closed loop extending around the teeth of the first plurality of artificial teeth. The closed loop may extend around the first boundary gingiva section with the first plurality of artificial teeth.

This may have the beneficial effect that by deformation of the deformable geometrical form of the deformable gingiva section movements of the dental arch in any of the three orthogonal directions of a three-dimensional space may be compensated effectively by deformation of the deformable geometrical form. The deformation may for example comprise a stretching and/or a shortening of the deformable gingiva section.

For example, the deforming of the first deformable geometrical form of the first deformable gingiva section is executed during the moving of the first dental arch.

For example, when moving the dental arch, the deformable geometrical form of the deformable gingiva section may be deformed in order to compensate the modification of the relative position and/or orientation of the dental arch relative to the fixed gingiva section. Thus, the deformable gingiva section may provide a bridging section bridging the space between the dental arch and the fixed gingiva section. For example, the deformable gingiva section may provide a bridging section bridging the space between the boundary gingiva section comprising the dental arch and the fixed gingiva section. The deformable gingiva section may be stretched, when the dental arch is moved away from the fixed gingiva section. The deformable gingiva section may be shortened, when the dental arch is moved towards the fixed gingiva section.

For example, a graphical user interface may be provided displaying the denture model with the dental arch to be moved as well as the artificial gingiva. The dental arch arranged within the artificial gingiva may, e.g., be selectable as a whole by the user using this, like a mouse. The selected dental arch may be moved relative to the fixed gingiva section of the artificial gingiva, while the modification of the relative position and/or orientation due to the movement may be compensated by adjusting, i.e., deforming, the deformable geometrical form of the deformable gingiva section.

For example, the deforming of the first deformable geometrical form of the first deformable gingiva section is executed after the moving of the first dental arch.

For example, the dental arch to be moved may be selected using a graphical user interface and moved relative to the fixed gingiva section. For example, when moving the dental arch, the form of the artificial gingiva may be maintained until an end position, at least a temporary end position, of the dental arch is reached. For example, the dental arch may be selected and moved using a track and drop mechanism provided by the graphical user interface. As soon as the selection, e.g., the selected dental arch is dropped at the designated, at least temporary, end position, the geometric form of the deformable gingiva section is deformed such that the modification of the relative position and/or orientation of the dental arch relative to the fixed gingiva section is compensated. For example, the form and position of a boundary of the deformable gingiva section adjacent to the teeth of the dental arch is known and maintained relative to the dental arch. Thus, the geometrical form of the deformable gingiva section may be modified such that it extends from a common boundary with the fixed gingiva section to the boundary adjacent to the teeth of the dental arch at the new position resulting from the movement of the dental arch.

For example, the moving of the first dental arch comprises a translation along a straight translation vector. The translation may, e.g., be a translation along the translation vector relative to the fixed gingiva section. For example, the translation vector may be a translation vector pointing towards one of the jaws of the patient. This may resemble an upward or downward movement of the bite line of the patient. For example, the translation vector may be pointing in the labial direction or in the direction of the pharynx, i.e., in a forward or backward direction, respectively.

For example, the moving of the first dental arch comprises a rotation around an axis of rotation. The axis of rotation may be any axis of rotation. For example, the axis of rotation resembles an axis of rotation extending through the bilateral temporomandibular joints of the patient. This may have the beneficial effect, that the occlusal plane of the denture may be adjusted.

For example, the axis of rotation may be provided by a hinge axis, e.g., of a digital articulator or a hinge axis of a digital jaw movement measurement device. The hinge axis may, e.g., resemble an axis extending through the bilateral temporomandibular joints of the patient.

For example, the deforming of the first deformable gingiva section comprises a smoothing of a surface of the first deformable gingiva section providing a smooth transition from a surface of the first fixed gingiva section to the surface of the first deformable gingiva section.

This may have the beneficial effect that a smooth transition from the surface of the fixed gingiva section to the surface of the deformable gingiva section is provided. The smoothening may be achieved by Laplacian smoothing. The smoothing refers to a smoothening of modifications of the transition due to the deformation of the deformable gingiva section. Any pre-defined surface structures of the deformable gingiva section, which are independent of the deformation, may not be smoothed.

For example, the smoothing of the surface of the first deformable gingiva section further provides a smooth surface connecting the surface of the first fixed gingiva section with the first boundary lines.

This may have the beneficial effect that the surface of the deformable gingiva section, e.g., the deformable geometrical form of the deformable gingiva section, is deformed such that the resulting surface provides a smooth transition starting at the boundary lines extending towards the fixed gingiva section.

The smoothing may, e.g., comprise a mimicking of an outer texture, i.e., surface structure, of a natural human gingiva, e.g., the patient's natural gingiva, in order to mimic, even after the deformation, the looks and feels of a natural human gingiva, e.g., the patient's natural gingiva.

For example, the smoothing of the surface of the first deformable gingiva section further provides a smooth transition from the surface of the first fixed gingiva section to the surface of the first boundary gingiva section.

This may have the beneficial effect that a smooth transition from a surface of the fixed gingiva section to the surface of the boundary gingiva section is provided by the surface of the deformable gingiva section extending between the fixed gingiva section and the boundary gingiva section, i.e., the deformable geometrical form of the deformable gingiva section.

For example, the smoothing comprises recalculating a form of the surface of the first deformable gingiva section.

For example, the form of the surface of the first deformable gingiva section, i.e., the geometrical form of the deformable gingiva section is recalculated in order to adjust the geometrical form to the modification of the position and/or orientation on the dental arch relative to the fixed gingiva section. For geometrical form of the deformable gingiva section is recalculated in order to adjust the geometrical form to the modification of the position and/or orientation of the boundary gingiva section with the dental arch relative to the fixed gingiva section.

For example, the digital 3D model of the denture further comprises a second denture part. The second denture part is configured for a second jaw of a patient. The first denture part is a maxillary denture part and the second denture part is a mandibular denture part. The second denture part comprises a second dental arch. The second dental arch comprise a second plurality of artificial teeth to be adjusted. The first plurality of artificial teeth is arranged in a second artificial gingiva.

The method further comprises adjusting a position of the second dental arch of the denture. The adjusting of the position of the second dental arch comprises defining a second deformable gingiva section of the second artificial gingiva with a second deformable geometrical form. The second deformable gingiva section is located between the teeth of the second plurality of artificial teeth and a second fixed gingiva section of the second artificial gingiva with a second fixed geometrical form. The second dental arch is moved as a whole relative to the second fixed gingiva section in order to adjust the position of the second dental arch with the teeth of the second plurality of artificial teeth maintaining fixed positions relative to each other. The second deformable geometrical form of the second deformable gingiva section is deformed due to the moving of the second dental arch, whereas the second fixed gingiva section maintains the second fixed geometrical form.

For example, the denture model may comprise a maxillary denture part and a mandibular denture part, each of which comprises an artificial gingiva providing a base of a respective denture part as well as a dental arch comprising a plurality of artificial teeth arranged within the respective artificial gingiva. For example, both denture arches may each be moved. The moving may comprise modifying the position and/or orientation of the dental arch being moved relative to a fixed gingiva section of the artificial gingiva in which the respective dental arch is arranged. For example, the two dental arches may be moved independently from each other. For example, the two dental arches may be moved together.

For example, the first and second dental arch are moved in combination as a whole with the teeth of the first plurality of artificial teeth maintaining fixed positions relative to the teeth of the second plurality of artificial teeth.

For example, the relative position and orientation of the two dental arches may be maintained. Thus, for example, the bite line of the patient may be adjusted by moving the two dental arches together. For example, the two dental arches may be arranged in occlusion. An occlusal plane may be defined by the two dental arches. The two dental arches may be moved in combination within the occlusal plane, such that the position and/or orientation of the occlusal plane remains unaltered due to the movement of the dental arches.

For example, the arches may be moved such that the position and/or orientation of the occlusal plane defined by the two dental arches is altered. Thus, the position and/or orientation of the occlusal plane may be adjusted in order to meet requirements of the individual patient.

For example, the first and second dental arch are arranged in occlusion, while being moved. Thus, the occlusion of the first and second dental arch may be maintained, when adjusting the positions of the first and second dental arch.

For example, the moving of the first and second dental arch in combination as a whole comprises a translation of the combination along the common straight translation vector.

The translation may, e.g., be a translation along the translation vector relative to the fixed gingiva section. For example, the translation vector may be a translation vector pointing towards one of the jaws of the patient. This may resemble an upward or downward movement of the bite line of the patient. For example, the translation vector may be pointing in the labial direction or in the direction of the pharynx, i.e., in a forward or backward direction, respectively.

For example, the moving of the first and second dental arch comprises a rotation of the combination around the common axis of rotation in a same rotating direction. For example, the axis of rotation resembles an axis of rotation extending through the bilateral temporomandibular joints of the patient. This may have the beneficial effect, that the occlusal plane of the denture may be adjusted.

For example, the axis of rotation may be provided by a hinge axis, e.g., of a digital articulator or a hinge axis of a digital jaw movement measurement device. The hinge axis may, e.g., resemble an axis extending through the bilateral temporomandibular joints of the patient.

For example, the moving of the first and second dental arch comprises a rotation of the first and second dental arch around the common axis of rotation in opposite rotating direction.

This may resemble an opening or closing of the bite defined by the two dental arches. For example, the axis of rotation resembles an axis of rotation extending through the bilateral temporomandibular joints of the patient. For example, the axis of rotation may be provided by a hinge axis, e.g., of a digital articulator or a hinge axis of a digital jaw movement measurement device. For example, the rotation may correspond to an adjusting of a digital incisal needle of a digital 3D model of an articulator.

For example, the second deformable gingiva section connects the second fixed gingiva section with one or more second boundary lines arranged at fixed positions at the teeth of the second plurality of artificial teeth. The form and position of the second boundary lines relative to the teeth of the second plurality of artificial teeth are maintained, when moving the second dental arch.

This may have the beneficial effect that the deformable gingiva section may extend from the teeth to the fixed gingiva section. Thus, the deformable gingiva section may comprise the artificial gingiva around the respective teeth. The deformable gingiva section may, e.g., comprise cut-outs for the artificial teeth. The boundaries of the cut-outs may, e.g., be provided by the second boundary lines. For manufacturing the denture, recesses may be for receiving the artificial teeth may be added within the deformable gingiva section. The recesses may, e.g., be slightly larger than the cut-outs providing a clearance around the artificial teeth for adding an adhesive for permanently fixing the artificial teeth within the recesses.

The deformable gingiva section may, e.g., comprise recesses configured for receiving the artificial teeth. The boundaries of the recesses may, e.g., be provided by the second boundary lines. The recesses may, e.g., be slightly larger than the tooth sections they are receiving, thus providing a clearance around the artificial teeth for adding an adhesive for permanently fixing the artificial teeth within the recesses.

For example, the second deformable gingiva section is in contact with the teeth of the second plurality of artificial teeth. Each of the second boundary lines defines a second contact line extending around one of the teeth of the second plurality of artificial teeth. The boundary lines may be boundary lines of the artificial gingiva defining cut-outs for the artificial teeth. For example, the cut-outs may have the form of the tooth sections which they are receiving.

For example, the one or more second boundary lines are arranged spaced apart from the teeth of the second plurality of artificial teeth and defines a clearance around each of the teeth of the second plurality of artificial teeth.

The boundary lines may be boundary lines of the artificial gingiva defining recesses for receiving the artificial teeth. For example, the recesses may, e.g., be slightly larger than the tooth sections they are receiving. Thus, each of the recesses may provide a clearance around the tooth it receives may provide a space for an adhesive used for establishing a fixed connection between the artificial gingiva and the artificial teeth.

For example, manufacturing the second denture part may comprise manufacturing the artificial gingiva providing a base of the denture part, as well as a second plurality of artificial teeth. The artificial gingiva may comprise a recess for each of the teeth of the second plurality of artificial teeth defining a position and orientation for the respective tooth. In order to permanently connect the artificial gingiva and the artificial teeth, an adhesive may be added to the respective recesses and the teeth may be arranged within the recesses.

When the adhesive is hardened, a permanent connection between the artificial gingiva and the artificial teeth may be established.

For example, the second deformable gingiva section connects the second fixed gingiva section with a second boundary gingiva section of the second gingiva. The second boundary gingiva section extends around teeth of the second plurality of artificial teeth. The second boundary gingiva section is moved together with the second dental arch. The second boundary gingiva section maintains a fixed fourth geometrical form and a fixed position relative to the teeth of second plurality of artificial teeth.

The boundary section may define a section of the artificial gingiva around the teeth of the dental arch being moved. The respective boundary gingiva section comprises a fixed geometrical form which is maintained, when moving the dental arch. Thus, for example the relative position of the boundary gingiva section to the dental arch is maintained, when moving the dental arch. In other words, the boundary section of the gingiva is moved together with the dental arch, i.e., the same translations and/or rotations which are applied to the dental arch, are applied to the boundary gingiva section. For example, only the deformable geometrical form of the deformable gingiva section is deformed due to the movement of the dental arch in combination with the boundary gingiva section.

This may have been the beneficial effect that the geometrical form of the artificial gingiva around the teeth of the dental arch being moved, i.e., the fixed geometrical form of the boundary gingiva section, is maintained independently of the positioning of the dental arch. Thus, the design of the artificial gingiva around the artificial teeth as well as any design adjustments of the artificial gingiva in view of the artificial teeth is preserved.

For example, the second boundary gingiva section is in contact with the teeth of the second plurality of artificial teeth. The second boundary gingiva section connects the teeth of the second plurality of artificial teeth, which are arranged within the second connection gingiva section, with the second deformable gingiva section. The contact lines may be boundary lines of the artificial gingiva defining cut-outs for the artificial teeth. For example, the cut-outs may have the form of the tooth sections which they are receiving.

For example, the second boundary gingiva section is spaced apart from the teeth of the second plurality of artificial teeth and defines a clearance around each of the teeth of the second plurality of artificial teeth.

The clearances may be provided by recesses arranged within the boundary gingiva section for receiving the artificial teeth. For example, the recesses may, e.g., be slightly larger than the tooth sections they are receiving. Thus, each of the recesses may provide a clearance around the tooth it receives may provide a space for an adhesive used for establishing a fixed connection between the artificial gingiva and the artificial teeth.

For example, manufacturing the second denture part may comprise manufacturing the artificial gingiva providing a base of the denture part, as well as a second plurality of artificial teeth. The artificial gingiva may comprise a recess for each of the teeth of the second plurality of artificial teeth defining a position and orientation for the respective tooth. In order to permanently connect the artificial gingiva and the artificial teeth, an adhesive may be added to the respective recesses and the teeth may be arranged within the recesses. When the adhesive is hardened, a permanent connection between the artificial gingiva and the artificial teeth may be established.

For example, the second boundary gingiva section may form a closed loop extending around the teeth of the second plurality of artificial teeth. The closed loop may extend around the second boundary gingiva section with the second plurality of artificial teeth.

This may have the beneficial effect that by deformation of the deformable geometrical form of the deformable gingiva section movements of the dental arch in any of the three orthogonal directions of a three-dimensional space may be compensated effectively by deformation of the deformable geometrical form. The deformation may for example comprise a stretching and/or a shortening of the deformable gingiva section.

For example, the deforming of the second deformable geometrical form of the second deformable gingiva section is executed during the moving of the second dental arch.

For example, when moving the dental arch, the deformable geometrical form of the deformable gingiva section may be deformed in order to compensate the modification of the relative position and/or orientation of the dental arch relative to the fixed gingiva section. Thus, the deformable gingiva section may provide a bridging section bridging the space between the dental arch and the fixed gingiva section. For example, the deformable gingiva section may provide a bridging section bridging the space between the boundary gingiva section comprising the dental arch and the fixed gingiva section. The deformable gingiva section may be stretched, when the dental arch is moved away from the fixed gingiva section. The deformable gingiva section may be shortened, when the dental arch is moved towards the fixed gingiva section.

For example, a graphical user interface may be provided displaying the denture model with the dental arch to be moved as well as the artificial gingiva. The dental arch arranged within the artificial gingiva may, e.g., be selectable as a whole by the user using this, like a mouse. The selected dental arch may be moved relative to the fixed gingiva section of the artificial gingiva, while the modification of the relative position and/or orientation due to the movement may be compensated by adjusting, i.e., deforming, the deformable geometrical form of the deformable gingiva section.

For example, the deforming of the second deformable geometrical form of the second deformable gingiva section is executed after the moving of the second dental arch.

For example, the dental arch to be moved may be selected using a graphical user interface and moved relative to the fixed gingiva section. For example, when moving the dental arch, the form of the artificial gingiva may be maintained until an end position, at least a temporary end position, of the dental arch is reached. For example, the dental arch may be selected and moved using a track and drop mechanism provided by the graphical user interface. As soon as the selection, e.g., the selected dental arch is dropped at the designated, at least temporary, end position, the geometric form of the deformable gingiva section is deformed such that the modification of the relative position and/or orientation of the dental arch relative to the fixed gingiva section is compensated. For example, the form and position of a boundary of the deformable gingiva section adjacent to the teeth of the dental arch is known and maintained relative to the dental arch. Thus, the geometrical form of the deformable gingiva section may be modified such that it extends from a common boundary with the fixed gingiva section to the boundary adjacent to the teeth of the dental arch at the new position resulting from the movement of the dental arch.

For example, the deforming of the second deformable geometrical form of the second deformable gingiva section comprises a smoothing of a surface of the second deformable gingiva section providing a smooth transition from a surface of the second fixed gingiva section to the surface of the second deformable gingiva section. The smoothing refers to a smoothening of modifications of the transition due to the deformation of the deformable gingiva section. Any pre-defined surface structures of the deformable gingiva section, which are independent of the deformation, may not be smoothed.

This may have the beneficial effect that a smooth transition from the surface of the fixed gingiva section to the surface of the deformable gingiva section is provided. The smoothening may be achieved by Laplacian smoothing.

The smoothing may, e.g., comprise a mimicking of an outer texture, i.e., surface structure, of a natural human gingiva, e.g., the patient's natural gingiva, in order to mimic, even after the deformation, the looks and feels of a natural human gingiva, e.g., the patient's natural gingiva.

For example, the smoothing of the surface of the second deformable gingiva section further provides a smooth surface connecting the surface of the second fixed gingiva section with the second boundary lines.

This may have the beneficial effect that the surface of the deformable gingiva section, e.g., the deformable geometrical form of the deformable gingiva section, is deformed such that the resulting surface provides a smooth transition starting at the boundary lines extending towards the fixed gingiva section.

For example, the smoothing of the surface of the second deformable gingiva section further provides a smooth transition from the surface of the second fixed gingiva section to the surface of the second boundary gingiva section.

This may have the beneficial effect that a smooth transition from a surface of the fixed gingiva section to the surface of the boundary gingiva section is provided by the surface of the deformable gingiva section extending between the fixed gingiva section and the boundary gingiva section, i.e., the deformable geometrical form of the deformable gingiva section.

For example, the smoothing comprises recalculating a form of the surface of the second deformable gingiva section.

For example, the form of the surface of the second deformable gingiva section, i.e., the geometrical form of the deformable gingiva section is recalculated in order to adjust the geometrical form to the modification of the position and/or orientation on the dental arch relative to the fixed gingiva section. For geometrical form of the deformable gingiva section is recalculated in order to adjust the geometrical form to the modification of the position and/or orientation of the boundary gingiva section with the dental arch relative to the fixed gingiva section.

For example, the providing of the digital 3D model of the denture comprises selecting a set of teeth from a tooth library comprising a plurality of sets of teeth. The selected set of teeth comprises the first plurality of artificial teeth.

For example, the providing of the digital 3D model of the denture comprises selecting a set of artificial teeth from a tooth library comprising a plurality of sets of artificial teeth. The selected set of artificial teeth comprises the first and second plurality of artificial teeth.

The artificial teeth of the denture may, e.g., originate from a tooth library comprising a plurality of sets of teeth, each of which comprising pre-defined features. From the sets of teeth provided by the tooth library a set of teeth may be selected for the patient's denture. The selection may be based on the form, size, surface structure and/or color of the teeth. The sets of teeth provided by the tooth library may each comprise a complete maxillary and/or a mandibular dental arch. The sets of artificial teeth may comprise a definition of the relative position and/or orientation of the teeth comprised by the same dental arch.

For example, the first and second plurality of artificial teeth of the selected set of teeth provides a pre-defined occlusion. The sets of teeth provided by the tooth library may each comprise a complete maxillary dental arch as well as a complete mandibular dental arch. The maxillary and the mandibular dental arches may be adjusted to each other. The selected set of teeth may further define a position and/or orientation of the two dental arches relative to each. For example, a pre-defined occlusion may result from the definition of the relative position and/or orientation of the two dental arches.

For example, the providing of the digital 3D model of the denture comprises selecting the first artificial gingiva from a gingiva library comprising a plurality of artificial gingivas.

The artificial gingiva may be selected from a gingiva library comprising a plurality of artificial gingivas. The artificial gingivas provided by the gingiva library may, e.g., differ from each other with respect to their geometrical form, surface structure and/or color. Furthermore, the artificial gingiva library may comprise a plurality of recesses. Each of the recesses may be configured to receive an artificial tooth. The recesses may define positions and/or orientations of the artificial teeth to be arranged within the respective recesses. For example, gingiva library may comprise a plurality of pre-defined sets of recesses. Each of the sets of recesses may be assigned to a set of teeth of a tooth library, such that the respective recesses are configured to receive the teeth of the respective set of teeth. For example, a gingiva from the gingiva library may be selected as well as a set of artificial teeth from the tooth library. With the set of artificial teeth, the associated assigned set of recesses may be selected and arranged within the selected artificial gingiva. The arrangement of the assigned recesses may, e.g., be executed automatically or semi-automatically. Thus, the selected set of teeth may easily be arranged within the artificial gingiva, e.g., within the recesses predefining the positions and/or orientations of the respective teeth within the artificial gingiva. The arrangement of the selected teeth within the recesses may, e.g., be executed automatically or semi-automatically.

For example, the providing of the digital 3D model of the denture comprises selecting the second artificial gingiva from the gingiva library. For example, the providing of the digital 3D model of the denture comprises selecting a set of artificial gingivas from a gingiva library comprising a plurality of sets of artificial gingivas. Each of the sets of artificial gingivas comprising a maxillary and a mandibular artificial gingiva. For example, the gingiva library may comprise sets of artificial gingivas with each set comprising two artificial gingivas assigned to each other, i.e., a maxillary artificial gingiva and a mandibular artificial gingiva.

For example, the method further comprises manufacturing the denture using the digital 3D model with the first dental arch arranged at the adjusted position and the first deformable gingiva section deformed due to the moving of the first dental arch.

For example, the first and/or the second denture part may be manufactured. Each of the denture parts may comprise an artificial gingiva and a dental arch being manufactured. The manufacturing may, e.g., example comprise manufacturing the artificial gingiva with a geometrical form defined by the digital 3D denture model resulting from the movement of the dental arch. The manufactured artificial gingiva may comprise a physical copy of the deformable gingiva section deformed due to an adjustment of the position of the teeth to be arranged within the respective artificial gingiva. Furthermore, the manufacturing may, e.g., comprise a manufacturing of the teeth of the dental arch. The teeth may be positioned within recesses comprised by the artificial gingiva and a permanent connection between the teeth and the artificial gingiva may be established. For establishing the permanent connection, an adhesive may be added to the recesses and the artificial teeth may be arranged within the recesses comprising the adhesive.

The adhesive may be used to establish a non-destructively detachable bonding between the artificial teeth and the artificial gingiva. For example, a soft, e.g., liquid, adhesive may be introduced and a non-destructively detachable bond being produced by curing the adhesive. The bonding may, e.g., comprise a polymerization using a polymerization adhesive.

The adhesive may be cured, e.g., by means of light-curing and/or heat-curing. In the course of curing a curing process comprising a polymerization, such as a chain polymerization, may take place. For example, plastic may be used as the adhesive for a polymerization. Depending on the application, the plastic may be a composite for achieving desired properties by means of a mixed polymer. The adhesive is, e.g., irreversibly cured in a light-curing unit using a polymerization lamp by means of light curing. Light curing enables a high degree of polymerization, precise determination of the start of polymerization and rapid complete polymerization. Alternatively and/or additionally, an oven may be used for heat-curing.

For example, the manufacturing of the denture comprises using at least one of the following devices: a machining device and a 3D printer.

For manufacturing the denture, a CAM method may be used. For example, the digital 3D model of the denture may be used for manufacturing a physical 3D copy of the digital 3D denture model. Using a manufacturing device, like a machining device or 3D printer, may enable a fast manufacturing, e.g., on site. These manufacturing devices may be controlled by a computer system provided with the digital 3D denture model defining an adjusted position of artificial teeth.

In another aspect, the invention relates to a computer program product for adjusting a position of artificial teeth of a denture. The computer program product comprises a computer readable storage medium. The computer readable storage medium has program instructions embodied therewith. The program instructions are executable by a processor of a computer system to cause the computer system to adjust the position of the artificial teeth of the denture.

The adjusting comprises provide a digital 3D model of the denture comprising at least a first denture part. The first denture part is configured for a first jaw of a patient. The first denture part comprises a first dental arch. The first dental arch comprises a first plurality of artificial teeth to be adjusted. The first plurality of artificial teeth is arranged in a first artificial gingiva.

A first deformable gingiva section of the first artificial gingiva with a first deformable geometrical form is defined. The first deformable gingiva section is located between the teeth of the first plurality of artificial teeth and a first fixed gingiva section of the first artificial gingiva with a first fixed geometrical form. The first dental arch is moved as a whole relative to the first fixed gingiva section in order to adjust the position of the first dental arch with the teeth of the first plurality of artificial teeth maintaining fixed positions relative to each other. The first deformable geometrical form of the first deformable gingiva section is deformed due to the moving of the first dental arch, whereas the first fixed gingiva section maintains the first fixed geometrical form.

The program instructions provided by the computer program product may be configured to cause the computer system to adjust the position of the artificial teeth of the denture according to any of the aforementioned examples.

In another aspect, the invention relates to a computer system for adjusting a position of artificial teeth of a denture. The computer system comprises a processor and a memory storing program instructions executable by the processor. Execution of the program instructions by the processor causes the computer system to adjust the position of the artificial teeth of the denture.

The adjusting comprises providing a digital 3D model of the denture comprising at least a first denture part. The first denture part is configured for a first jaw of a patient. The first denture part comprises a first dental arch. The first dental arch comprises a first plurality of artificial teeth to be adjusted. The first plurality of artificial teeth is arranged in a first artificial gingiva. A first deformable gingiva section of the first artificial gingiva with a first deformable geometrical form is defined. The first deformable gingiva section is located between the teeth of the first plurality of artificial teeth and a first fixed gingiva section of the first artificial gingiva with a first fixed geometrical form. The first dental arch is moved as a whole relative to the first fixed gingiva section in order to adjust the position of the first dental arch with the teeth of the first plurality of artificial teeth maintaining fixed positions relative to each other. The first deformable geometrical form of the first deformable gingiva section is deformed due to the moving of the first dental arch, whereas the first fixed gingiva section maintains the first fixed geometrical form.

The computer system may be configured to execute a method for adjusting the position of the artificial teeth of the denture according to any of the aforementioned examples.

For example, the execution of the program instructions by the processor further causes the computer system further to control one or more manufacturing devices configured for manufacturing the denture using the digital 3D model with the first dental arch at the adjusted position and the first deformable gingiva section deformed due to the moving of the first dental arch.

For example, the computer system is comprised by a system. The system may furthermore comprise one or more manufacturing device.

For example, the execution of the program instructions by the processor may cause the computer system to control one of the manufacturing devices to manufacture the artificial gingiva using the digital 3D model. For example, the execution of the program instructions by the processor may cause the computer system to further control one or more of the manufacturing devices to manufacture artificial teeth, e.g., the teeth of the first and/or second plurality of artificial teeth, using the digital 3D model of the denture. Thus, the teeth of the first and/or second dental arch may be provided. For example, the execution of the program instructions by the processor may cause the computer system to further control one of the manufacturing devices to manufacture an artificial gingiva, e.g., a maxillary and/or mandibular artificial gingiva, using the digital 3D model of the denture.

The teeth of the first dental arch, e.g., a maxillary dental arch, may be arranged and fixed at pre-defined positions provided by the maxillary artificial gingiva. The positions may be defined by recesses within the artificial gingiva. The recesses may furthermore define an orientation for each of the teeth of the first dental arch. The first dental arch may be fixed within the artificial gingiva using an adhesive. Thus, a first denture part, e.g., a maxillary denture part, may be provided, which is a physical copy of the first digital denture part defined the digital 3D model of the denture.

The teeth of the second dental arch, e.g., a mandibular dental arch, may be arranged and fixed at pre-defined positions provided by the mandibular artificial gingiva. The positions may be defined by recesses within the artificial gingiva. The recesses may furthermore define an orientation for each of the teeth of the second dental arch. The second dental arch may be fixed within the artificial gingiva using an adhesive. Thus, a second denture part, e.g., a mandibular denture part, may be provided, which is a physical copy of the second digital denture part defined the digital 3D model of the denture. For example, a full denture comprising a maxillary and a mandibular denture part may be provided.

For example, the manufacturing device for manufacturing the denture comprising at least one of the following devices: a machining device and a 3D printer.

The above-described examples and embodiments may be combined freely as long as the combinations are not mutually exclusive.

In the following, embodiments of the invention are described in greater detail in which FIG. 1 shows an exemplary digital 3D model of a maxillary denture part;

In the following similar features are denoted by the same reference numerals.

Figure 1:
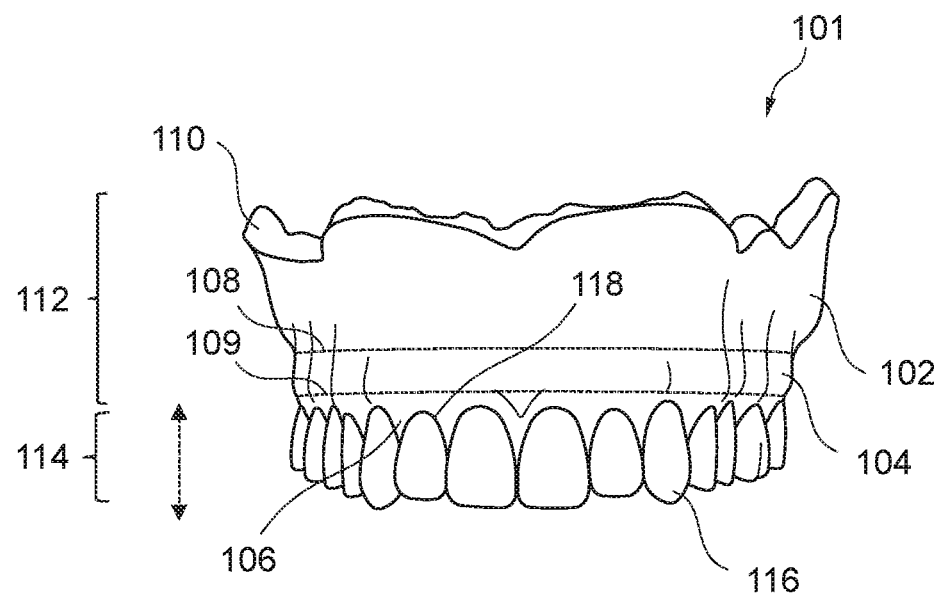

FIG. 1 shows an exemplary digital 3D model of a maxillary denture part 101. The maxillary denture part 101 comprises an artificial gingiva 112. The artificial gingiva 112 mimics the appearance of a natural gingiva and provides a base for a maxillary dental arch 114. The maxillary dental arch 114 comprises a plurality of artificial teeth 116, which are arranged within the artificial gingiva 112. The artificial gingiva 112 may comprise a plurality of recesses 118, which are configured to receive the artificial teeth 116 of the maxillary dental arch 114. For example, the position and form of the recesses 118 are configured such that the recesses 118 predefine positions and/or orientations of the artificial teeth 116 of the maxillary dental arch 114 within the artificial gingiva 112.

For the artificial gingiva 112 of the digital 3D model of a maxillary denture part 101 different sections may be defined. A deformable gingiva section 104 may be defined with a deformable geometrical form. The deformable gingiva section 104 is located between a boundary gingiva section 106 and a fixed gingiva section 102. The boundary gingiva section 106 may comprise the recesses 118, in which the artificial teeth are arranged. Thus, the deformable gingiva section may, e.g., form a closed loop extending around the boundary gingiva section 106 with the maxillary dental arch 114. The boundary gingiva section 106 as well as the fixed gingiva section 102 each have a fixed geometrical form. The deformable gingiva section 104 may, e.g., be limited by two boundaries 108, 109. Boundary 108 is a common boundary with the fixed gingiva section 102. Boundary 109 is a common boundary with the boundary gingiva section 106.

The digital 3D model of a maxillary denture part 101 may be configured for the patient's maxillary jaw. The fixed gingiva section 102 may comprise a support surface 110 which is configured to support the maxillary denture part 101 onto the soft and/or hard tissue of the patient's maxillary jaw. The geometrical form of the support surface 110 may, e.g., be a native of the geometrical form of the soft and/or hard tissue of the patient's maxillary jaw. The geometrical form of the soft and/or hard tissue of the patient's maxillary jaw may be provided for configurating the support surface 110, e.g., using scan data. The scan data may be the result of a direct and/or indirect scan of the soft and/or hard tissue of the patient's maxillary jaw. A direct scan may be an intraoral scan of the patient's mouth, i.e., a scan of soft and/or hard tissues of the patient's oral cavity. An indirect scan may be a scan of an impression of the soft and/or hard tissues of the patient's oral cavity or a scan of a physical model, e.g., a plaster cast model, generated using such an impression.

In order to adjust the position of the maxillary dental arch 114 of the digital 3D model of a maxillary denture part 101, the maxillary dental arch 114 may be selected and moved as a whole relative to the fixed gingiva section 102. The moving may, e.g., comprise a translation along a straight translation vector and/or a rotation around an axis of rotation. When moving the maxillary dental arch 114 as a whole, the teeth 116 of the maxillary dental arch 114 maintain their positions as well as their orientations relative to each other. For example, the boundary gingiva section 106 may be moved together with the maxillary dental arch 114. When being moved, the boundary gingiva section 106 may maintain its fixed geometrical form. The boundary gingiva section 106 may further maintain its position and/or orientation relative to the maxillary dental arch 114 being moved.

The fixed gingiva section 102 may remain unmoved and maintain its fixed geometrical form. Thus, the movement of the maxillary dental arch 114 is compensated by deforming the deformable geometrical form of the deformable gingiva section 104. For example, the height of an occlusal plane and/or the canine line may be adjusted by moving the maxillary dental arch 114 upwards or downwards, i.e., towards the fixed gingiva section 102 or away from the fixed gingiva section 102. Moving the maxillary dental arch 114 towards the fixed gingiva section 102 may be compensated by deforming the geometrical form of the deformable gingiva section 104 such that the deformable gingiva section 104 is shorten. Moving the maxillary dental arch 114 away from the fixed gingiva section 102 may be compensated by deforming the geometrical form of the deformable gingiva section 104 such that the deformable gingiva section 104 is stretched.

Figure 2:
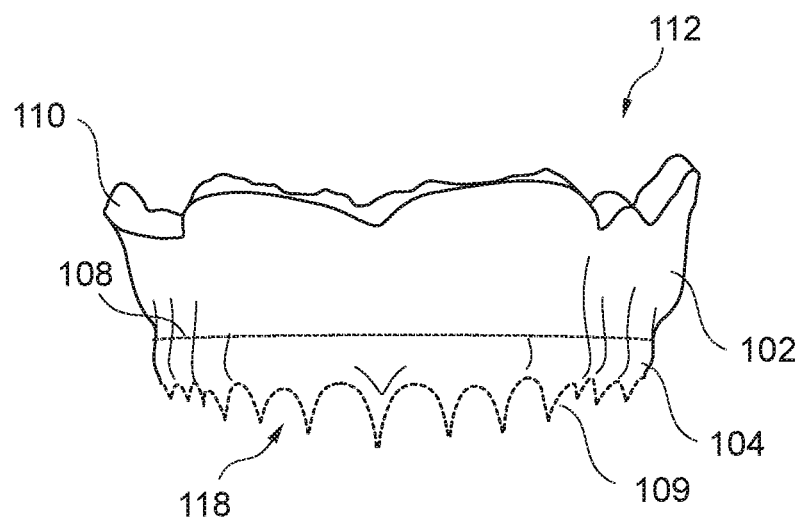
FIG. 2 shows an exemplary digital 3D model of an artificial gingiva.

FIG. 2 shows an exemplary digital 3D model of an artificial gingiva 112. Like the artificial gingiva 112 of FIG. 1, the artificial gingiva 112 of FIG. 2 comprises a fixed gingiva section 102 with a fixed geometrical form and a support surface for supporting the artificial gingiva 112 on the soft and/or hard tissue of the patient's maxillary jaw. The deformable gingiva section 104 extends to the rims of the recesses 118. The second boundary 109 of the deformable gingiva section 104 is provided by boundary lines extending around the teeth 116 of the maxillary dental arch 114. The boundary lines 109 may be provided by the rims of the recesses 118. When moving the maxillary dental arch 114, the recesses 118 may be moved with the maxillary dental arch 114. The recess 118 may maintain their geometrical forms, their positions and/or their orientations relative to the teeth 116 of the maxillary dental arch 114 being moved. Thus, the boundary lines 109 may be moved together with the boundary lines 109, while maintaining their forms, their positions and/or their orientations relative to the teeth 116 of the maxillary dental arch 114 being moved. Thus, the section of the artificial gingiva 112 exiting between the recesses 118 and the fixed gingiva section 112, i.e., the deformable gingiva section 104, may be deformed in order to compensate the adjustment of the position of the maxillary dental arch 114 relative to the fixed gingiva section 112.

Figure 3:
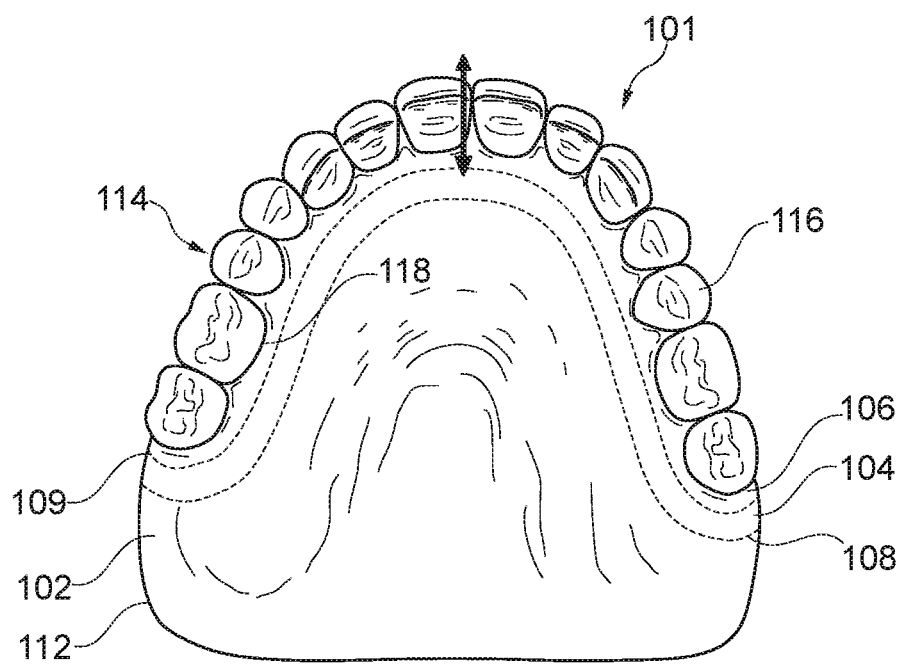
FIG. 3 shows an exemplary digital 3D model of a maxillary denture part.

FIG. 3 shows an occlusal view on an exemplary digital 3D model of a maxillary denture part 101. As the maxillary denture part 101 of FIG. 1, the maxillary denture part 101 of FIG. 3 comprises a maxillary dental arch 114 with a plurality of artificial teeth 116 arranged within an artificial gingiva 112. The artificial gingiva 112 may comprise a plurality of recesses 118, in which the artificial teeth 116 of the maxillary dental arch 114 are arranged. The recesses 118 may predefine the positions and/or orientations of the artificial teeth 116 of the maxillary dental arch 114. The artificial gingiva 112 may comprise a fixed gingiva section 102 with a fixed geometrical form. The fixed gingiva section 102 may provide a base for the artificial gingiva which remains unaltered, when adjusting the position of the maxillary dental arch 114.

A deformable gingiva section 104 with a deformable geometrical form may be defined between the fixed gingiva section 102 and a boundary gingiva section 106. The boundary gingiva section 106 may extend around the artificial teeth 116 of the maxillary dental arch 114 and, like the fixed gingiva section 102, may maintain a fixed geometrical form, when the maxillary dental arch 114 is moved. The boundary gingiva section 106 may, e.g., be moved with the maxillary dental arch 114 maintaining its geometrical form, position and/or orientation relative to the artificial teeth 116 of the maxillary dental arch 114. In order to compensate any movements of the maxillary dental arch 114 relative to the fixed gingiva section 102, a deformable geometrical form of the deformable gingiva section 104 may be deformed.

For example, the maxillary dental arch 114 may be moved in labial direction or in oral direction towards the pharynx, i.e., in a forward/backward direction. Moving the maxillary dental arch 114 in labial direction may, e.g., result in a shortening of the labial part of deformable gingiva section 104 extending as a closed loop around the boundary gingiva section 106. The palatine part of deformable gingiva section 104, corresponding to the lingual part of the boundary gingiva section in case of a mandibular denture part, may, e.g., be stretched. Moving the maxillary dental arch 114 in oral direction may, e.g., result in a stretching of the labial part and a shortening of the palatine part of deformable gingiva section 104. Such an adjustment of the position of the maxillary dental arch 114 may, e.g., be required in order to adjust a support of the lips and/or cheeks of the patient by the denture being configured.

Figure 4:
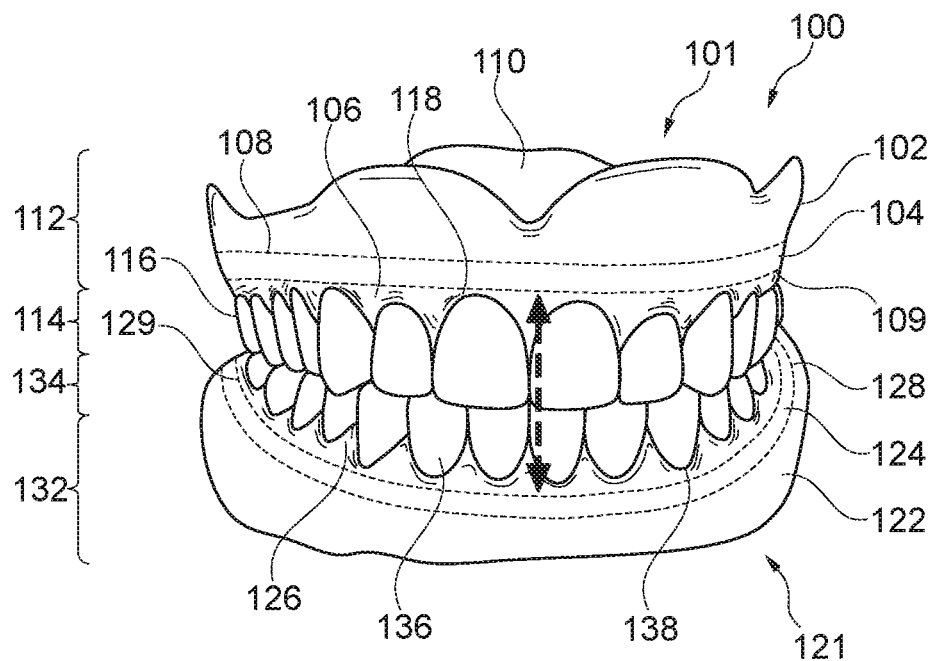
FIG. 4 shows an exemplary digital 3D model of a denture.

FIG. 4 shows an exemplary digital 3D model of a denture 100 comprising a maxillary denture part 101 and a mandibular denture part 121. The maxillary denture part 101 of FIG. 4 corresponds to the maxillary denture part 101 of FIG. 1. In addition to the maxillary denture part 101, the digital 3D model of a denture 100 comprises a mandibular denture part 121.

The mandibular denture part 121 comprises a mandibular dental arch 134 with a plurality of artificial teeth 136 arranged within an artificial gingiva 132. The artificial gingiva 132 may comprise a plurality of recesses 138, in which the artificial teeth 136 of the mandibular dental arch 134 are arranged. The recesses 138 may predefine the positions and/or orientations of the artificial teeth 136 of the mandibular dental arch 134. The artificial gingiva 132 may comprise a fixed gingiva section 122 with a fixed geometrical form. The fixed gingiva section 122 may provide a base for the artificial gingiva which remains unaltered, when adjusting the position of the mandibular dental arch 134.

A deformable gingiva section 124 with a deformable geometrical form may be defined between the fixed gingiva section 122 and a boundary gingiva section 126. The boundary gingiva section 126 may extend around the artificial teeth 136 of the mandibular dental arch 134 and, like the fixed gingiva section 122, may maintain a fixed geometrical form, when the mandibular dental arch 134 is moved. The boundary gingiva section 126 may, e.g., be moved with the mandibular dental arch 134 maintaining its geometrical form, position and/or orientation relative to the artificial teeth 136 of the mandibular dental arch 134. In order to compensate any movements of the mandibular dental arch 134 relative to the fixed gingiva section 122, a deformable geometrical form of the deformable gingiva section 124 may be deformed.

The maxillary dental arch 114 and the mandibular dental arch 134 may be arranged in occlusion and moved in combination as a whole, while being arranged in occlusion. By moving the maxillary dental arch 114 and the mandibular dental arch 134 together, e.g., the height of the occlusal plane may be adjusted. For example, the height of the canine line may be adjusted and/or the height of the dental arches 114, 134 relative to the patient's smile line may be adjusted. When moving the maxillary dental arch 114 and the mandibular dental arch 134 upwards, the deformable gingiva section 104 of the maxillary denture part 101 may, e.g., be shortened, while the deformable gingiva section 124 of the mandibular denture part 121 may, e.g., be stretched. When moving the maxillary dental arch 114 and the mandibular dental arch 134 downwards, the deformable gingiva section 104 of the maxillary denture part 101 may, e.g., be stretched, while the deformable gingiva section 124 of the mandibular denture part 121 may, e.g., be shorten. The fixed gingiva section 104 of the maxillary denture part 101 and the fixed gingiva section 124 of the maxillary denture part 121 may remain unaltered, when moving the maxillary dental arch 114 and the mandibular dental arch 134. Both fixed gingiva section 104 may maintain their geometrical forms, positions and/or orientations.

Figure 5:
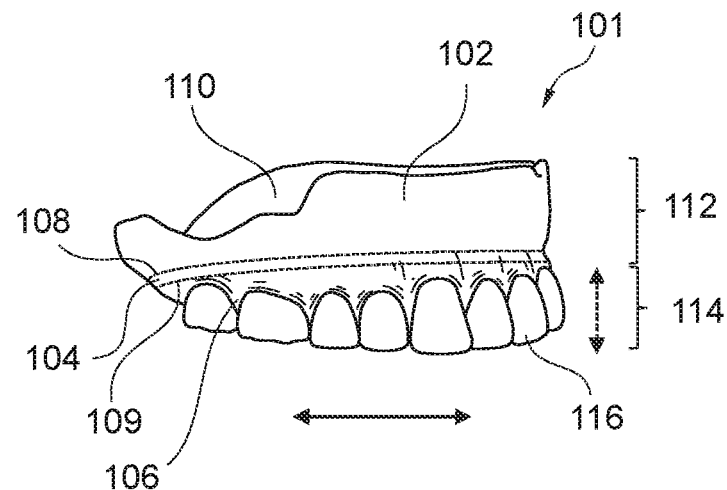
FIG. 5 shows an exemplary digital 3D model of a maxillary denture part.

FIG. 5 shows a buccal view on an exemplary digital 3D model of a maxillary denture part 101. The maxillary denture part 101 of FIG. 5 corresponds to the maxillary denture part 101 of FIG. 1. For example, the maxillary dental arch 114 may be moved in labial direction or in oral direction towards the pharynx, i.e., in a forward/backward direction. Moving the maxillary dental arch 114 in labial direction may, e.g., result in a shortening of the labial part of deformable gingiva section 104 extending as a closed loop around the boundary gingiva section 106. The palatine part of deformable gingiva section 104, corresponding to the lingual part of the boundary gingiva section in case of a mandibular denture part, may, e.g., be stretched. Moving the maxillary dental arch 114 in oral direction may, e.g., result in a stretching of the labial part and a shortening of the palatine part of deformable gingiva section 104. Such an adjustment of the position of the maxillary dental arch 114 may, e.g., be required in order to adjust a support of the lips and/or cheeks of the patient by the denture being configured.

For example, the maxillary dental arch 114 may be moved upwards or downwards direction. Moving the maxillary dental arch 114 downwards may, e.g., result in a stretching of the complete deformable gingiva section 104 extending as a closed loop around the boundary gingiva section 106. Moving the maxillary dental arch 114 upwards may, e.g., result in a shortening of the complete deformable gingiva section 104 extending as a closed loop around the boundary gingiva section 106. Such an adjustment of the position of the maxillary dental arch 114 may, e.g., be required in order to adjust the height of the occlusal plane, the height of the canine line and/or the height of the maxillary dental arch 114 relative to the smile line of the patient.

Figure 6:
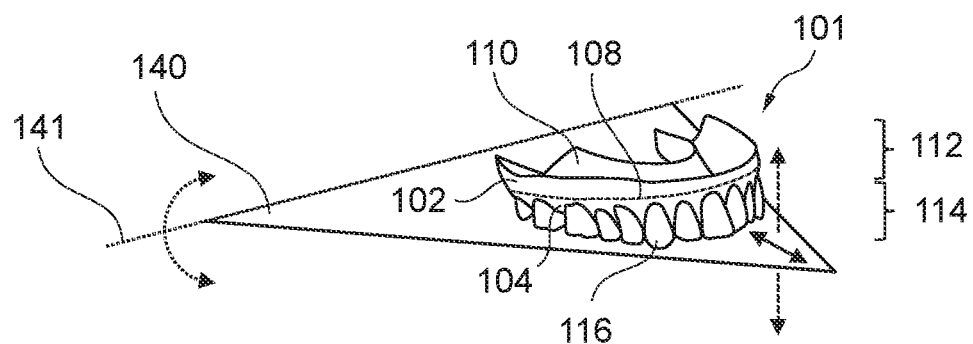
FIG. 6 shows an exemplary digital 3D model of a maxillary denture part and an occlusal plane.

FIG. 6 shows an exemplary digital 3D model of a maxillary denture part 101 and an occlusal plane 140. The maxillary denture part 101 of FIG. 6 may, e.g., comprise an artificial gingiva part 112 corresponding to the artificial gingiva part 112 of FIG. 2 as well as a maxillary dental arch 114 corresponding to the maxillary dental arch 114 of FIG. 1. Furthermore, the occlusal plane 140 of the maxillary denture part 101 is shown. The maxillary dental arch 114 may, e.g., be moved within the occlusal plane 140, e.g., backwards or forwards, such that the position and orientation of the occlusal plane 140 remain unaltered. The maxillary dental arch 114 may, e.g., be moved perpendicularly to the occlusal plane 140 shown in FIG. 6, i.e., upward or downwards. By moving the maxillary dental arch 114 perpendicularly to the occlusal plane 140 shown in FIG. 6, the height of the occlusal plane may be adjusted. The maxillary dental arch 114 may, e.g., be rotated around an axis of rotation 141. The axis of rotation 141 may, e.g., extend through the bilateral temporomandibular joints of the patient. By rotating the maxillary dental arch 114 around the axis of rotation 141, the orientation of the occlusal plane 140, which is rotated with the maxillary dental arch 114, may adjusted.

Figure 7:
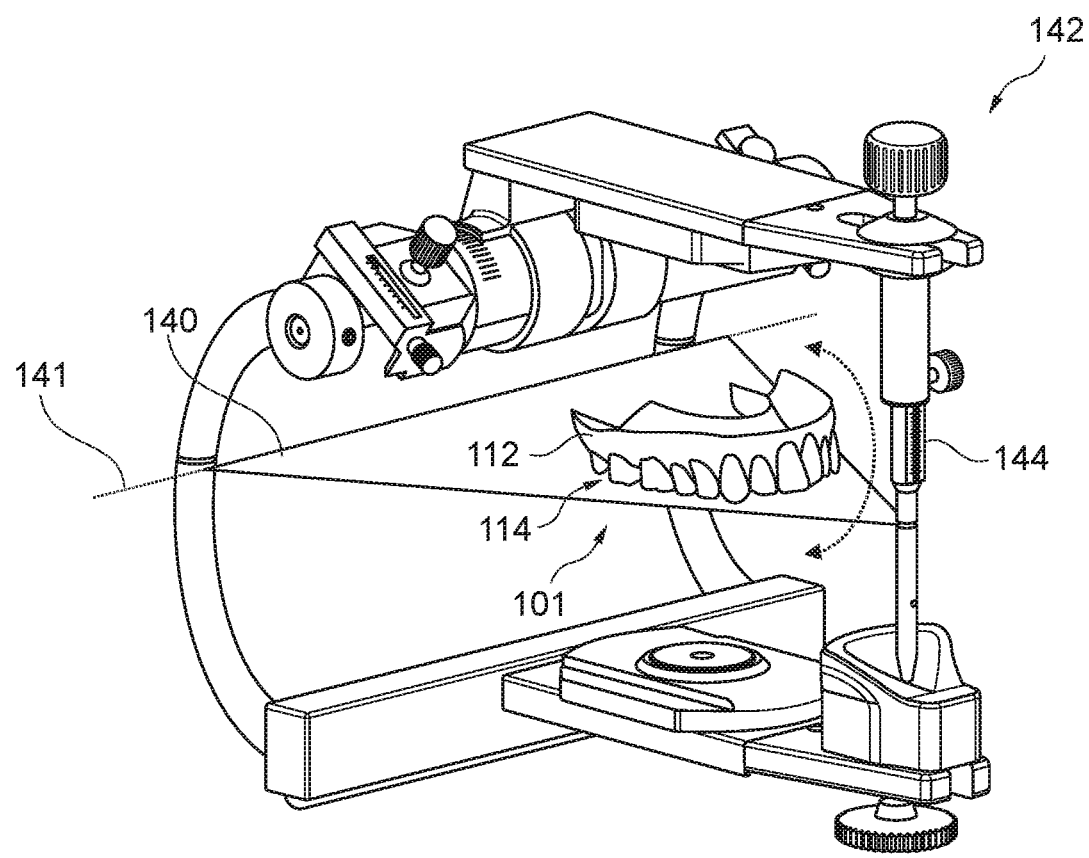
FIG. 7 shows an exemplary digital 3D model of an articulator and a maxillary denture part.

FIG. 7 shows an exemplary digital 3D model of an articulator 142 and a maxillary denture part 101. The digital 3D model of an articulator 142 may, e.g., provide a digital copy of a physical articulator.

The articulator 142 is configured to digitally reproduce some or all the movements of the mandibular jaw in relation to the maxillary jaw of the patient. A digital 3D model of a denture of the patient, e.g., comprising the digital 3D model of the maxillary denture part 101, is arranged within the articulator 142. The articulator 142 is used to check that the interdigitation of the teeth of the digital 3D model is correct and that the occlusal plane is anatomically functional for movements of the mandibular jaw in relation to the maxillary jaw using the articulator 124 to simulate the respective movements. In order to determine the correct position of the digital 3D model of the denture in the articulator 142 a digital facebow may be used.

Such a digital facebow may measure parameters regarding the position of the patient's jaws and provide the measured data in digital form. The virtual position data of the patient's jaws may be transferred to a computer and imported into a program providing a digital articulator 142. The facebow may, e.g., be used to determine the position data of the patient's maxillary jaw in relation to the base of the skull and/or the temporomandibular joints. The facebow may, e.g., use the patient's external auditory canals and nose as reference positions. For example, the facebow may be fixed on both sides of the external auditory canals, e.g., with olives, and with a nose support on the patient's head. Alternatively, the facebow may be fixed to the patient's head and the relative position of the external auditory canals and/or the nose may be measured. Furthermore, the position of the maxillary and/or mandibular jaw relative to the reference positions may be determined. For example, a mouthpiece, like a bite fork, is provided. The mouthpiece may, e.g., be pressed against the chewing surfaces or incisal edges of the maxillary teeth to measure their position. Furthermore, position data of the mandibular jaw in relation to the maxillary jaw may be measured. Thus, a registration of the position(s) of the patient's jaw(s) may be provided.

In addition, data regarding the patient's individual movements of the mandibular jaw in relation to the maxillary jaw may be measured and provided as digital input data for the digital articulator 142. The digital position data of the patient's jaws may be imported into the digital articulator 142. The digital 3D model of the denture may be provided, e.g., imported into the 3D virtual representation of the physical articulator 142. The digital 3D model of the denture may be positioned in the digital articulator 142 using the digital position data of the jaws.

The 3D virtual representation of the physical articulator 142 may be used to perform a digital articulation of the digital 3D model of the denture, i.e., adjust the articulation of the digital 3D model. The articulation refers to the contact relationship of the occlusal surfaces of the teeth of maxillary and mandibular dental arches, when moving into and away from centric occlusion. In the course of the digital articulation, the digital 3D model of the denture may be adjusted until a suitable articulation is achieved.

The digital 3D model of the articulator 142 may comprise an adjustable incisal needle 144. By adjusting the incisal needle 144, the maxillary dental arch 114 may, e.g., be rotated around an axis of rotation 141. The axis of rotation 141 may, e.g., represent an axis extending through the bilateral temporomandibular joints of the patient. By rotating the maxillary dental arch 114 around the axis of rotation 141, the orientation of the occlusal plane 140 rotated with the maxillary dental arch 114 may adjusted.

Figure 8:
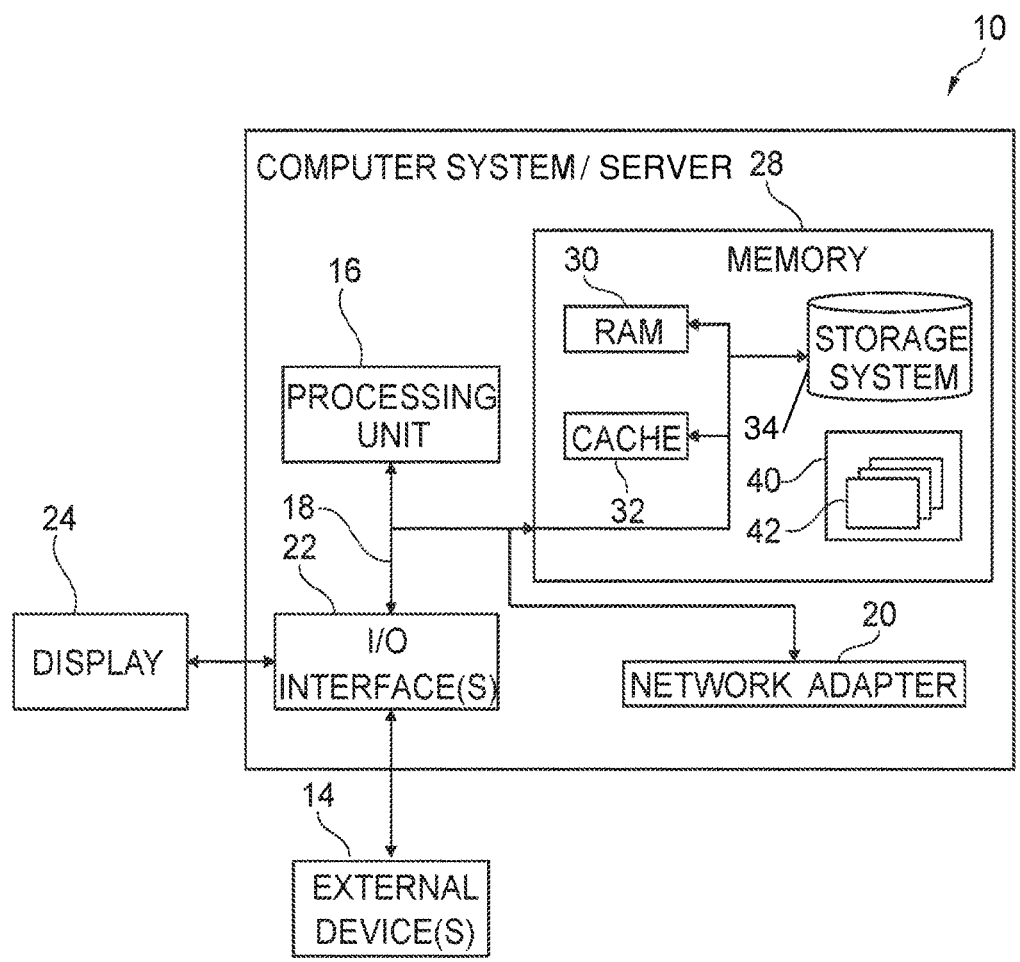
FIG. 8 shows an exemplary computer system for adjusting a position of artificial teeth of a denture.

FIG. 8 shows a schematic diagram of an exemplary computer system 10 for adjusting a position of artificial teeth of a denture by adjusting a position of one or two dental arches of the denture. The computer system 10 may be operational with numerous other general-purpose or special-purpose computing system environments or configurations. Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

In FIG. 8, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random-access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured to adjust a position of one or two dental arches of a denture. Memory 28 may, e.g., further comprise a tooth library providing a plurality of pre-defined sets of artificial teeth and/or a gingiva library providing a plurality of pre-defined artificial gingivas. From the tooth library a set of teeth and/or from the gingiva library one or two gingivas may be selected for providing a digital 3D model of the denture.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may enable an adjustment of a position of one or two dental arches of a denture.

Computer system 10 may further communicate with one or more external devices 14 such as a keyboard, a pointing device, like a mouse, and a display 24 enabling a user to interact with computer system 10. Such communication can occur via input/output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 8 may be configured for adjusting a position of one or two dental arches of a denture. The computer system 10 may be a standalone computer with no network connectivity that may receive data to be processed through a local interface. The data received by computer system 10 may for example comprise scan data of a patient's mouth from an intraoral scan or from a scan of a classical mold/impression, e.g., providing information about the surface structure of the patient's tissue on which the denture is to be placed. This data may be used to generate the digital 3D model of the denture. Alternatively, the data received may, e.g., comprise a digital 3D model of the denture. The computer system 10 may be used to adjust the position of one or two dental arches of the digital 3D model of the denture. Such operation may, however, likewise be performed using a computer system that is connected to a network such as a communications network and/or a computing network.

Figure 9:
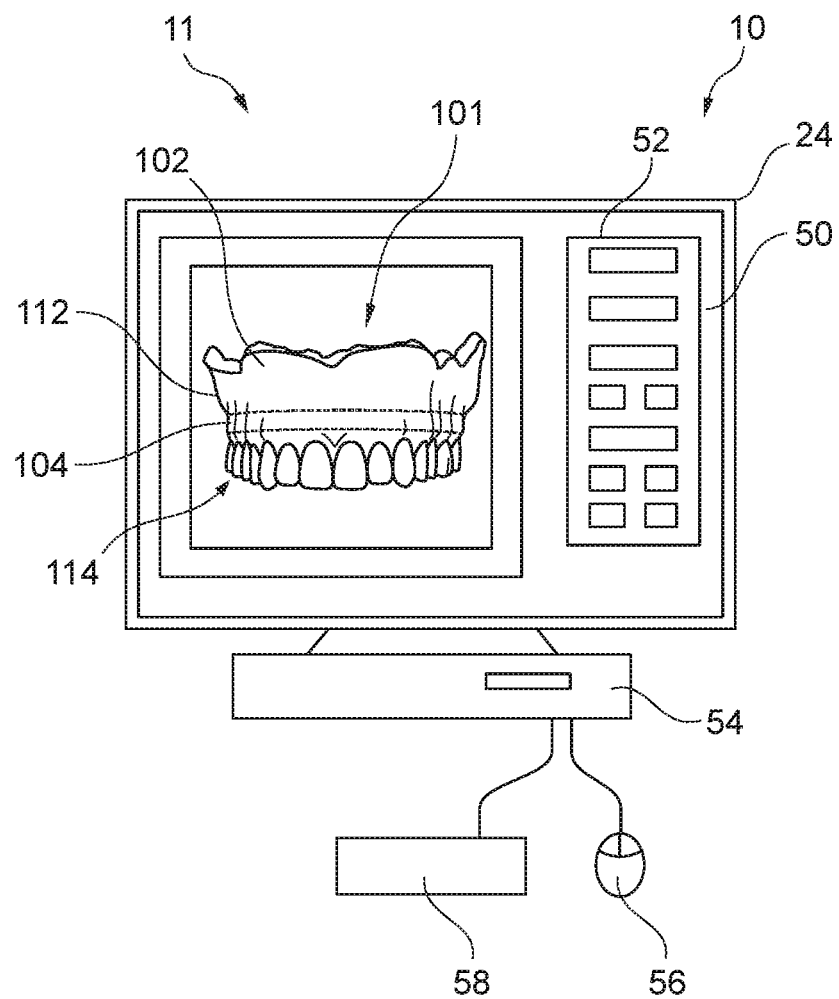
FIG. 9 shows an exemplary computer system for adjusting a position of artificial teeth of a denture.

FIG. 9 shows an exemplary system 11 comprising a computer system 10 for adjusting a position of one or two dental arches of a denture. The computer system 10 may, e.g., be configured as shown in FIG. 8. The computer system 10 may comprise a hardware component 54 comprising one or more processors as well as a memory storing machine-executable program instructions. Execution of the program instructions by the one or more processors may cause the one or more processors to control the computer system 10 to adjust the position of one or two dental arches of a digital 3D model of a denture. The adjusting may comprise providing the digital 3D model of the denture, defining deformable gingiva sections of a maxillary and/or mandibular artificial gingiva comprised by the digital 3D model of the denture and moving a maxillary and/or mandibular dental arch of the digital 3D model of the denture relative to a fixed gingiva section of the maxillary and/or mandibular artificial gingiva. The geometrical form, position and/or orientation of the fixed gingiva section of the maxillary and/or mandibular artificial gingiva remain unaltered, while moving the maxillary and/or mandibular dental arch. In order to compensate the moving of the maxillary and/or mandibular dental arch, the deformable gingiva sections of a maxillary and/or mandibular artificial gingiva may be deformed. The moving may comprise one or more translations along one or more translation vectors and/or one or more rotations around one or more axes of rotation.

The computer system 10 may further comprise one or more input devices, like a keyboard 54 and a mouse 56, enabling a user to interact with the computer system 10. Furthermore, the computer system 10 may comprise one or more output devices, like a display 24 providing a graphical user interface 50 with control elements 52, e.g., GUI elements, enabling the user to control the adjusting a position of the dental arch 114 of the maxillary denture part 101 displayed on the display 24. Furthermore, the control elements 52 may, e.g., be used to define the deformable gingiva section 104, to select the maxillary dental arch 114 for movement as a whole and/or to move the selected maxillary dental arch 114 relative to a fixed gingiva part 102 of the maxillary denture part 101. The moving may comprise one or more translations and/or one or more rotations.

Figure 10:
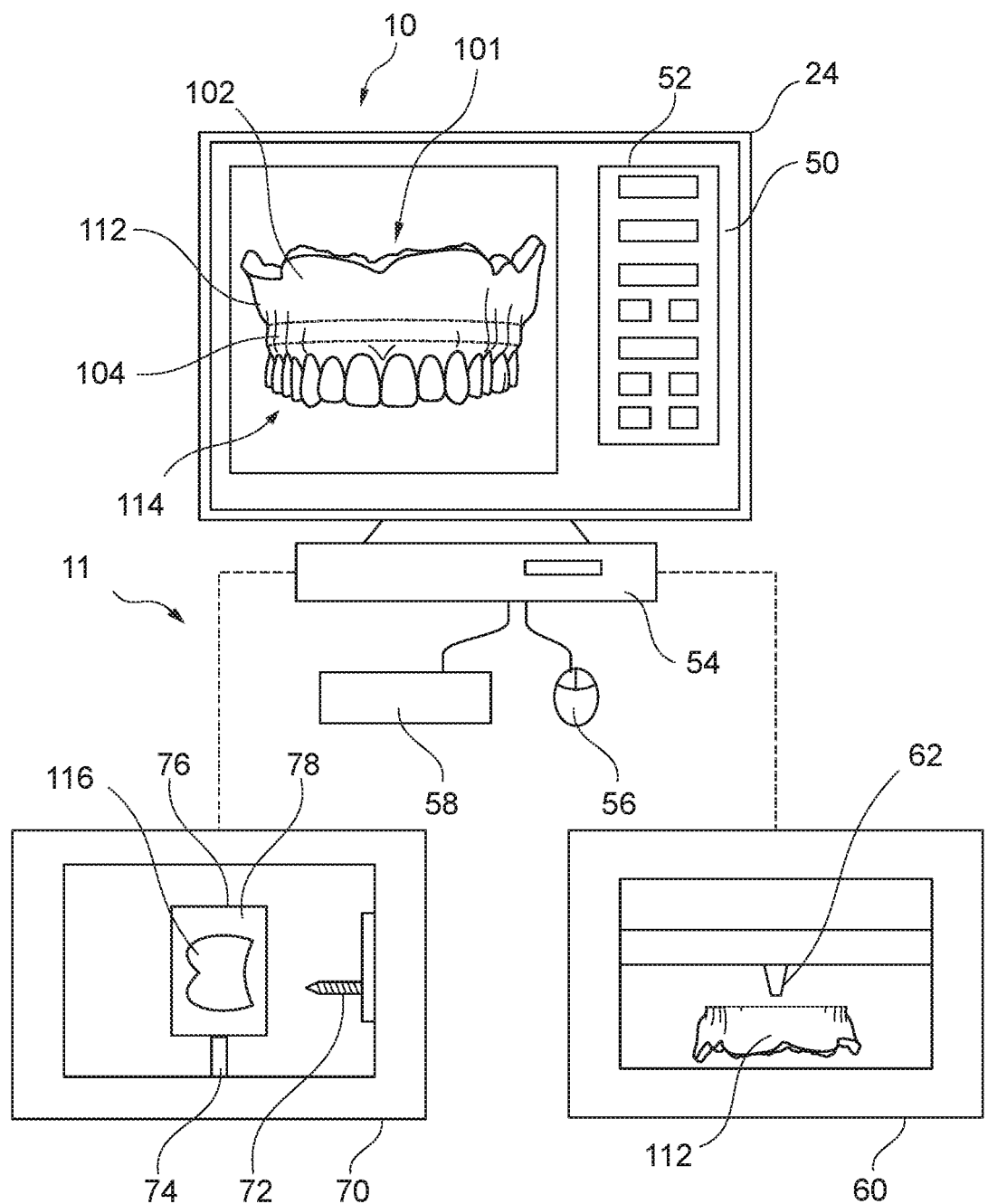
FIG. 10 shows an exemplary system for configurating and generating a denture.

FIG. 10 shows an exemplary system 11 for adjusting a position of one or two dental arches of a denture, which is furthermore configured to manufacture one or more artificial gingivas partially deformed due to the adjusting of the position of the one or two dental arches.

Furthermore, the system 11 may be configured to manufacture teeth of the dental arches of the denture. The manufactured artificial gingiva may be a physical copy of the artificial gingiva of the digital 3D model of the denture. The system 11 may comprise the computer system 10 of FIG. 9. The computer system 10 may further be configured to control one or more manufacturing devices 60, 70. For example, the system 11 may comprise a manufacturing device in form of a machining device 70 controlled by the computer system 10. The machining device 70 may be configured to machining a blank 76 using one or more machining tools 72. The blank 76 of raw material 78 may be provided using a holding device 74 and cut into a desired final shape and size of the dental element to be manufactured, e.g., one or more teeth 116 of a dental arch of a denture, using the one or more machining tools 72 for executing a controlled material-removal process. The machining tool 72 may, e.g., be a milling tool. The digital 3D model, e.g., of the maxillary denture part 101, may provide a template of the dental elements manufactured using the machining device 70, e.g., teeth 106.

For example, the system 11 may comprise a manufacturing device in form of a 3D printing device 60. The 3D printing device 60 may be controlled by the computer system 10 and configured to print one or more dental element to be manufactured, e.g., an artificial gingiva 112 defining an adjusted position of a dental arch. The 3D printing device 60 may comprise a printing element 62 configured to print the respective dental element, like the artificial gingiva 112, layer by layer. The digital 3D model 101 may provide a template of the physical dental element manufactured using the 3D printing device 60, e.g., of the artificial gingiva 112.

Furthermore, the system 11 may comprise one or more scanner for acquiring scan data to generate a digital 3D model of a denture comprising a maxillary and/or mandibular denture part. These scanners may, e.g., comprise an optical scanner configured for performing an intraoral optical scan of the surface of the intraoral tissue of the patient. For example, an impression of the intraoral tissue or a physical model, like a plaster cast model, may be scanned using the optical scanner. The scanners may further comprise other types of scanners in order to acquire scan data of the patient intraoral tissue. The scanners may, e.g., comprise an X-ray scanner and/or a tomography scanner, like a cone beam computed tomography (CBCT) scanner. Alternatively or additionally, various other types of scanners of oral and maxillofacial radiology may be used.

Figure 11:
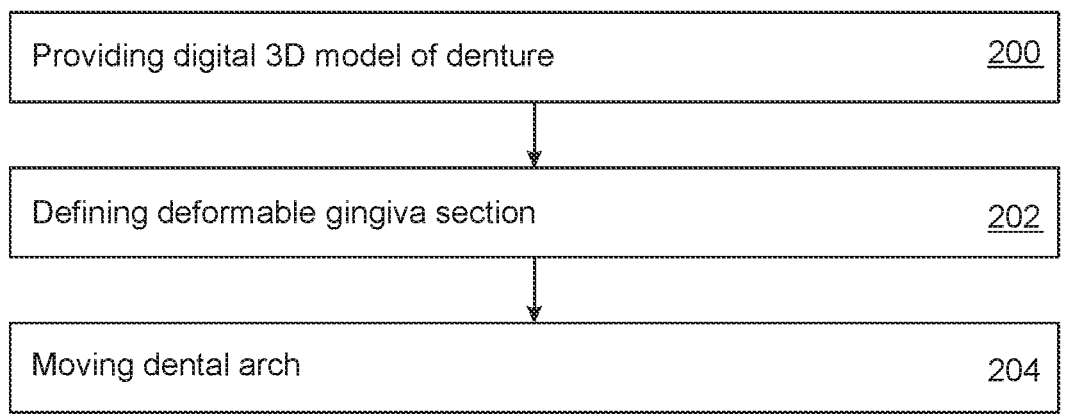
FIG. 11 shows a flowchart illustrating an exemplary method for adjusting a position of artificial teeth of a denture.

FIG. 11 shows an exemplary method for adjusting a position of artificial teeth of a denture. In block 200, a digital 3D model of the denture is provided. The providing of the digital 3D model may, e.g., comprise generating the model using scan data of a patient's intraoral tissue. The digital 3D model of the denture may comprise at least one denture part, e.g., a maxillary or mandibular denture part. For example, the digital 3D model may comprise a maxillary denture part and a mandibular denture part. A maxillary denture part is configured to be arrange on an edentulous maxillary jaw of a patient. A mandibular denture part is configured to be arrange on an edentulous mandibular jaw of a patient. Each denture part comprises an artificial denture. Each denture part comprises a dental arch, i.e., a maxillary or mandibular dental arch. Each dental arch comprises a plurality of artificial teeth arranged in the artificial gingiva of the respective denture part. The position of the maxillary and/or mandibular dental arch may have to be adjusted.

In block 202, a deformable gingiva section is defined with a deformable geometrical form. For example, a deformable gingiva section is defined for each of the denture parts comprised by the denture. For example, a deformable gingiva section with a deformable geometry is defined for a maxillary denture part comprised by the denture. The deformable gingiva section of the maxillary artificial gingiva may be located between the teeth of the maxillary dental arch and a fixed gingiva section of the maxillary artificial gingiva with a fixed geometrical form. For example, the deformable gingiva section may extend as closed loop around a boundary gingiva section with a fixed geometry comprising the maxillary dental arch. The deformable gingiva section may extend from the fixed gingiva section to the boundary gingiva section.

For example, a deformable gingiva section with a deformable geometry is defined for a mandibular denture part comprised by the denture. The deformable gingiva section of the mandibular artificial gingiva may be located between the teeth of the mandibular dental arch and a fixed gingiva section of the mandibular artificial gingiva with a fixed geometrical form. For example, the deformable gingiva section may extend as closed loop around a boundary gingiva section with a fixed geometry comprising the mandibular dental arch. The deformable gingiva section may extend from the fixed gingiva section to the boundary gingiva section.

In block 204, one or more dental arches of the digital 3D model of the denture are moved. Each of the dental arches is moved as a whole, i.e., forms as well as relative positions and/or orientations of the teeth of respective dental arch are maintained, while moving the dental arch. The dental arch is moved relative to the fixed gingiva section of the artificial gingiva comprising the respective dental arch. Geometrical form, position and/or orientation of the fixed gingiva section are maintained, while moving the dental arch. The deformable geometrical form of the deformable gingiva section of the artificial gingiva comprising the respective dental arch is deformed due to the moving of the dental arch, whereas the fixed gingiva section of the artificial gingiva comprising the respective dental arch maintains its fixed geometrical form. By deforming the geometrical form of the deformable gingiva section extending between the dental arch and the fixed gingiva section, the modification of the relative position of the dental arch and the fixed gingiva section is compensated.

For example, a maxillary dental arch is moved relative to a fixed section of a maxillary artificial gingiva of the denture. For example, a mandibular dental arch is moved relative to a fixed section of a mandibular artificial gingiva of the denture. For example, the maxillary and mandibular dental arch are moved independently of each other. For example, the maxillary and mandibular dental arch are moved in combination as a whole relative to the fixed gingiva sections of the maxillary and mandibular artificial gingivas.

The moving may, e.g., comprise a translation along a translation vector. The moving may, e.g., comprise a rotation around an axis of rotation. In case the maxillary and mandibular dental arch are moved independently of each other, the maxillary and mandibular dental arch may, e.g., be rotated around the same axis of rotation in opposite directions. In case the, maxillary and mandibular dental arch are moved in combination as a whole, the maxillary and mandibular dental arch may, e.g., be rotated around the same axis of rotation in the same direction.

Figure 12:
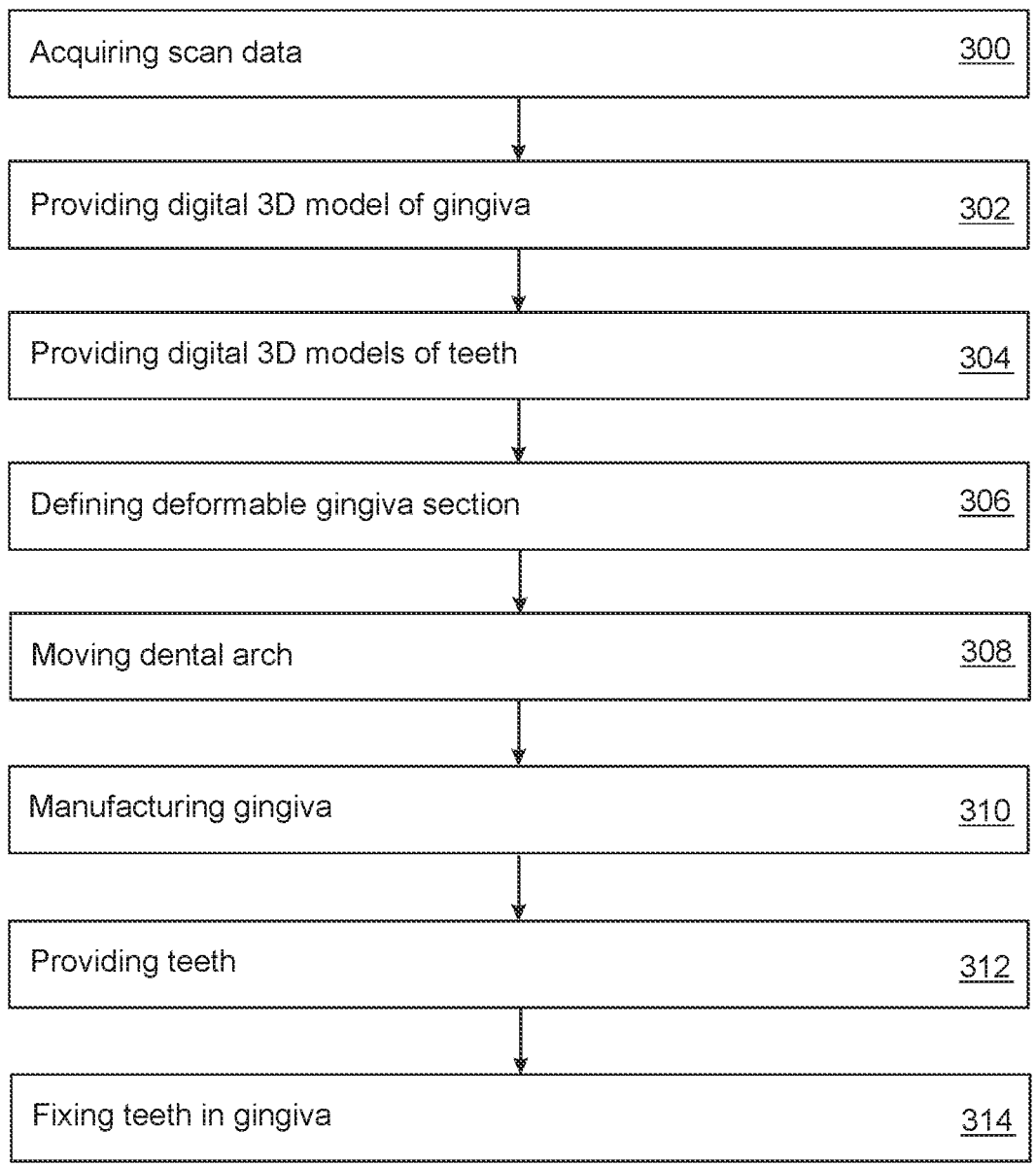
FIG. 12 shows a flowchart illustrating an exemplary method for configurating and generating a denture.

FIG. 12 shows an exemplary method for configurating and generating a denture. The configurating comprises adjusting a position of artificial teeth of a denture. In block 300, scan data resembling a structure of intraoral tissue of a patient may be acquired. The scan data may, e.g., be scan data acquired using a direct scan of the oral cavity of the patient. For the direct scan, e.g., an intraoral scanner may be used. The scan data may, e.g., be scan data acquired using a direct scan. For example, an impression, in particular a secondary impression, of the intraoral tissue of a patient may be scanned. For example, a physical model, like a plaster cast model, in particular a secondary physical model, of the intraoral tissue of a patient may be scanned.

In block 302, a digital 3D model of an artificial gingiva is provided. For example, the denture to be configured comprises a maxillary and a mandibular denture part. In this case, a maxillary and a mandibular artificial gingiva may be provided. For example, the providing of the one or more artificial gingivas may comprise generating digital 3D models the respective artificial gingivas using the scan data acquired in block 300. For example, the providing of the one or more artificial gingivas may comprise adjusting pre-defined digital 3D models of the respective artificial gingivas using the scan data acquired in block 300. The pre-defined digital 3D models may be provided as a set of a maxillary and a mandibular gingiva by a gingiva library. Such a gingiva library may comprise a plurality of different pre-defined gingivas, from which the set with the maxillary and mandibular gingiva may be selected.

The adjusting of the one or more pre-defined digital 3D models of the respective artificial gingivas using the scan data may comprise adjusting the size and/or the form of the pre-defined artificial gingiva to the intraoral tissue structure of the patient. For example, a size and/or geometrical form of a support surface of the artificial gingiva for supporting the artificial gingiva on the maxillary or mandibular tissue structure of the patient may be adjusted to match the respective tissue structure. For example, the geometrical form of the support surface may be a negative of a geometrical form of the respective tissue structure. For example, a height of the pre-defined digital 3D models may be adjusted to the dimensions of the oral cavity of the patient, in particular to the resting vertical dimension of the patient. For example, a patient individual relative position of a maxillary artificial gingiva and a mandibular artificial gingiva may be defined using the acquired scan data.

In block 304, digital 3D models of teeth of the denture may be provided. The teeth provided may comprise maxillary teeth of the maxillary dental arch and/or mandibular teeth of the mandibular dental arch. The digital 3D models of the teeth may, e.g., be selected from a tooth library providing a plurality of different sets of teeth. Each of the sets of teeth may, e.g., comprise teeth of a complete maxillary and/or mandibular dental arch. The selected set of teeth may be arranged within the artificial gingivas provided in block 302. For example, the gingivas comprise a pre-defined set of recesses pre-defining the position and/or orientation of the teeth. For example, a pre-defined set of recesses assigned to the selected set of teeth is used. Furthermore, the geometrical forma, sizes, surface structures, positions, orientations and/or colors of the teeth may be fine-tuned, if necessary.

Thus, a digital 3D model of a patient individual denture may be provided. This, digital 3D model may be used to manufacture a wax try-in and/or a trial denture as a physical copy of the digital 3D model. The wax try-in and trial denture may be used to test the design of the digital 3D model. In particular, occlusal relationship, aesthetics, phonetics and/or patient comfort may be checked. The testing may reveal that an adjustment of the position of the dental arches of the denture is necessary.

In block 306, a deformable gingiva section is defined. For example, deformable gingiva sections are defined for each of the artificial gingivas comprised by the denture, e.g., for a maxillary and/or a mandibular artificial gingiva. The deformable gingiva sections may be defined automatically, semi-automatically and/or manually. For example, in case an artificial gingiva selected from a gingiva library is used, the artificial gingiva may comprise a pre-defined deformable gingiva section. Thus, the deformable gingiva section may be defined by the artificial gingiva selected.

In block 308, the dental arches of the denture are moved relative to the fixed gingiva sections of the artificial gingivas comprising the dental arches in order to adjust their positions. The required adjustments may be identified based on a test of a way try-in and/or a trial denture.

Each of the dental arches is moved as a whole, i.e., forms as well as relative positions and/or orientations of the teeth of respective dental arch are maintained, while moving the dental arch. The dental arch is moved relative to the fixed gingiva section of the artificial gingiva comprising the respective dental arch. Geometrical form, position and/or orientation of the fixed gingiva section are maintained, while moving the dental arch. The deformable geometrical form of the deformable gingiva section of the artificial gingiva comprising the respective dental arch is deformed due to the moving of the dental arch, whereas the fixed gingiva section of the artificial gingiva comprising the respective dental arch maintains its fixed geometrical form. By deforming the geometrical form of the deformable gingiva section extending between the dental arch and the fixed gingiva section, the modification of the relative position of the dental arch and the fixed gingiva section is compensated.

For example, a maxillary dental arch is moved relative to a fixed section of a maxillary artificial gingiva of the denture. For example, a mandibular dental arch is moved relative to a fixed section of a mandibular artificial gingiva of the denture. For example, the maxillary and mandibular dental arch are moved independently of each other. For example, the maxillary and mandibular dental arch are moved in combination as a whole relative to the fixed gingiva sections of the maxillary and mandibular artificial gingivas.

The moving may, e.g., comprise a translation along a translation vector. The moving may, e.g., comprise a rotation around an axis of rotation. In case the maxillary and mandibular dental arch are moved independently of each other, the maxillary and mandibular dental arch may, e.g., be rotated around the same axis of rotation in opposite directions. In case the, maxillary and mandibular dental arch are moved in combination as a whole, the maxillary and mandibular dental arch may, e.g., be rotated around the same axis of rotation in the same direction.

In block 310, the artificial gingivas comprised by the digital 3D model of the denture are manufactured. For manufacturing the artificial gingivas for example a rapid prototyping method may be used. For example, a machining device or a 3D printing device may be used. The manufactured artificial gingivas are physical copies of the digital 3D models of the artificial gingivas comprised by the digital 3D model of the denture. The manufactured artificial gingivas may resemble the deformations of the digital 3D models of the artificial gingivas due to the moving of the dental arches. The manufactured artificial gingivas may each comprise a plurality of recesses defining positions and orientations of the teeth of the dental arch to be arranged within the respective artificial gingiva. The positions and/or orientations defined by the manufactured artificial gingivas may be the result of the adjustment of the positions of the dental arches.

In block 312, the teeth of the dental arches of the denture are provided. The teeth may, e.g., be manufactured. For manufacturing the artificial gingivas for example a rapid prototyping method may be used. For example, a machining device or a 3D printing device may be used. Alternatively, pre-manufactured teeth may be provided.

In block 314, the teeth provided in Block 112 are arranged and fixed in the artificial gingivas manufactured in block 310. The artificial gingivas may comprise plurality of recesses for receiving the artificial teeth. The cross-sections of the recesses may be slightly larger than the cross-sections of the artificial teeth such that a small clearance remains around the artificial teeth providing space for an adhesive. For example, the adhesive may be added to the recesses and the artificial teeth may be arranged within the recesses. After hardening of the adhesive, the artificial teeth may be permanently fixed within the recesses of the artificial gingiva.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium.

In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for adjusting a position of artificial teeth of a denture, the adjusting of the position of the first dental arch of the denture comprising:
    providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
    defining a first deformable gingiva section of the first artificial gingiva with a first deformable geometrical form, the first deformable gingiva section being located between the teeth of the first plurality of artificial teeth and a first fixed gingiva section of the first artificial gingiva with a first fixed geometrical form;
    moving the first dental arch as a whole relative to the first fixed gingiva section in order to adjust the position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

2. The method of feature combination 1, wherein the first denture part is a maxillary or a mandibular denture part.

3. The method of any of the previous feature combination, wherein the first deformable gingiva section connects the first fixed gingiva section with one or more first boundary lines arranged at fixed positions at the teeth of the first plurality of artificial teeth, the form and position of the first boundary lines relative to the teeth of the first plurality of artificial teeth being maintained, when moving the first dental arch.

4. The method of feature combination 3, the first deformable gingiva section being in contact with the teeth of the first plurality of artificial teeth, each of the first boundary lines defining a first contact line extending around one of the teeth of the first plurality of artificial teeth.

5. The method of feature combination 3, the one or more first boundary lines being arranged spaced apart from the teeth of the first plurality of artificial teeth defining a clearance around each of the teeth of the first plurality of artificial teeth.

6. The method of any of the items 1 to 2, wherein the first deformable gingiva section connects the first fixed gingiva section with a first boundary gingiva section of the first gingiva, the first boundary gingiva section extending around teeth of the first plurality of artificial teeth, the first connection gingiva section being moved together with the first dental arch, the first connection gingiva section maintaining a fixed third geometrical form and a fixed position relative to the teeth of the first plurality of artificial teeth.

7. The method of feature combination 6, wherein the first boundary gingiva section being in contact with the teeth of the first plurality of artificial teeth, the first boundary gingiva section connecting the teeth of the first plurality of artificial teeth, which are arranged within the first connection gingiva section, with the first deformable gingiva section.

8. The method of feature combination 6, wherein the first boundary gingiva section being spaced apart from the teeth of the first plurality of artificial teeth defining a clearance around each of the teeth of the first plurality of artificial teeth.

9. The method of any of the items 6 to 8, the first deformable gingiva section forming a closed loop extending around the first boundary gingiva section with the first plurality of artificial teeth.

10. The method any of the previous feature combination, the deforming of the first deformable geometrical form of the first deformable gingiva section being executed during the moving of the first dental arch.

11. The method any of the items 1 to 9, the deforming of the first deformable geometrical form of the first deformable gingiva section being executed after the moving of the first dental arch.

12. The method of any of the previous feature combination, the moving of the first dental arch comprising a translation along a straight translation vector.

13. The method of any of the previous feature combination, the moving of the first dental arch comprising a rotation around an axis of rotation.

14. The method of feature combination 13, the axis of rotation resembling an axis of rotation extending through the bilateral temporomandibular joints of the patient.

15. The method of any of the previous feature combination, the deforming of the first deformable gingiva section comprising a smoothing of a surface of the first deformable gingiva section providing a smooth transition from a surface of the first fixed gingiva section to the surface of the first deformable gingiva section.

16. The method of feature combination 15, the smoothing of the surface of the first deformable gingiva section further providing a smooth surface connecting the surface of the first fixed gingiva section with the first boundary lines.

17. The method of feature combination 15, the smoothing of the surface of the first deformable gingiva section further providing a smooth transition from the surface of the first fixed gingiva section to the surface of the first boundary gingiva section.

18. The method of any of the items 15 to 17, the smoothing comprises recalculating a form of the surface of the first deformable gingiva section.

19. The method of any of the previous feature combination, the digital 3D model of the denture further comprising a second denture part, the second denture part being configured for a second jaw of a patient, the first denture part being a maxillary denture part and the second denture part being a mandibular denture part, the second denture part comprising a second dental arch, the second dental arch comprising a second plurality of artificial teeth to be adjusted, the second plurality of artificial teeth being arranged in a second artificial gingiva;

the method further comprising adjusting a position of the second dental arch of the denture, the adjusting of the position of the second dental arch comprising:

defining a second deformable gingiva section of the second artificial gingiva with a second deformable geometrical form, the second deformable gingiva section being located between the teeth of the second plurality of artificial teeth and a second fixed gingiva section of the second artificial gingiva with a second fixed geometrical form;

moving the second dental arch as a whole relative to the second fixed gingiva section in order to adjust the position of the second dental arch with the teeth of the second plurality of artificial teeth maintaining fixed positions relative to each other, the second deformable geometrical form of the second deformable gingiva section being deformed due to the moving of the second dental arch, whereas the second fixed gingiva section maintains the second fixed geometrical form.

20. The method of feature combination 19, wherein the first and second dental arch are moved in combination as a whole with the teeth of the first plurality of artificial teeth maintaining fixed positions relative to the teeth of the second plurality of artificial teeth.

21. The method of feature combination 20, wherein the first and second dental arch are arranged in occlusion, while being moved.

22. The method of any of the items 20 to 21, the moving of the first and second dental arch in combination as a whole comprises a translation of the combination along the common straight translation vector.

23. The method of any of the items 20 to 22, the moving of the first and second dental arch comprising a rotation of the combination around the common axis of rotation in a same rotating direction.

24. The method of feature combination 19, the moving of the first and second dental arch comprising a rotation of the first and second dental arch around the common axis of rotation in opposite rotating direction.

25. The method of any of the items 19 to 24, the second deformable gingiva section connecting the second fixed gingiva section with one or more second boundary lines arranged at fixed positions at the teeth of the second plurality of artificial teeth, the form and position of the second boundary lines relative to the teeth of the second plurality of artificial teeth being maintained, when moving the second dental arch.

26. The method of feature combination 25, the second deformable gingiva section being in contact with the teeth of the second plurality of artificial teeth, each of the second boundary lines defining a second contact line extending around one of the teeth of the second plurality of artificial teeth.

27. The method of feature combination 25, the one or more second boundary lines being arranged spaced apart from the teeth of the second plurality of artificial teeth defining a clearance around each of the teeth of the second plurality of artificial teeth.

28. The method of any of the items 19 to 24, wherein the second deformable gingiva section connects the second fixed gingiva section with a second boundary gingiva section of the second gingiva, the second boundary gingiva section extending around teeth of the second plurality of artificial teeth, the second boundary gingiva section being moved together with the second dental arch, the second boundary gingiva section maintaining a fixed fourth geometrical form and a fixed position relative to the teeth of second plurality of artificial teeth.

29. The method of feature combination 28, wherein the second boundary gingiva section being in contact with the teeth of the second plurality of artificial teeth, the second boundary gingiva section connecting the teeth of the second plurality of artificial teeth, which are arranged within the second connection gingiva section, with the second deformable gingiva section.

30. The method of feature combination 28, wherein the second boundary gingiva section being spaced apart from the teeth of the second plurality of artificial teeth defining a clearance around each of the teeth of the second plurality of artificial teeth.

31. The method of any of the items 28 to 30, the second deformable gingiva section forming a closed loop extending around the second boundary gingiva section with the second plurality of artificial teeth.

32. The method of any of the items 19 to 31, the deforming of the second deformable geometrical form of the second deformable gingiva section being executed during the moving of the second dental arch.

33. The method of any of the items 19 to 31, the deforming of the second deformable geometrical form of the second deformable gingiva section being executed after the moving of the second dental arch.

34. The method of any of the items 19 to 33, the deforming of the second deformable geometrical form of the second deformable gingiva section comprising a smoothing of a surface of the second deformable gingiva section providing a smooth transition from a surface of the second fixed gingiva section to the surface of the second deformable gingiva section.

35. The method of feature combination 34, the smoothing of the surface of the second deformable gingiva section further providing a smooth surface connecting the surface of the second fixed gingiva section with the second boundary lines.

36. The method of feature combination 34, the smoothing of the surface of the second deformable gingiva section further providing a smooth transition from the surface of the second fixed gingiva section to the surface of the second boundary gingiva section.

37. The method of any of feature combinations 34 to 36, the smoothing comprising recalculating a form of the surface of the second deformable gingiva section.

38. The method of any of the previous feature combination, the providing of the digital 3D model of the denture comprising selecting a set of teeth from a tooth library comprising a plurality of sets of teeth, the selected set of teeth comprising the first plurality of artificial teeth.

39. The method of any of the items 19 to 38, the providing of the digital 3D model of the denture comprising selecting a set of artificial teeth from a tooth library comprising a plurality of sets of artificial teeth, the selected set of artificial teeth comprising the first and second plurality of artificial teeth.

40. The method of feature combination 39, the first and second plurality of artificial teeth of the selected set providing a pre-defined occlusion.

41. The method of any of the previous feature combination, the providing of the digital 3D model of the denture comprising selecting the first artificial gingiva from a gingiva library comprising a plurality of artificial gingivas.

42. The method of any of the items 19 to 41, the providing of the digital 3D model of the denture comprising selecting a set of artificial gingivas from a gingiva library comprising a plurality of sets of artificial gingivas, each of the sets of artificial gingivas comprising a maxillary and a mandibular artificial gingiva.

43. The method of any of the previous feature combination, the method further comprising manufacturing the denture using the digital 3D model with the first dental arch arranged at the adjusted position and the first deformable gingiva section deformed due to the moving of the first dental arch.

44. The method of feature combination 43, the manufacturing of the denture comprising using at least one of the following devices: a machining device and a 3D printer.

45. A computer program product for adjusting a position of artificial teeth of a denture, the computer program product comprising a computer readable storage medium having program instructions embodied therewith, the program instructions being executable by a processor of a computer system to cause the computer system to adjust the position of the first dental arch of the denture, the adjusting comprising:
providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
defining a first deformable gingiva section of the first artificial gingiva with a first deformable geometrical form, the first deformable gingiva section being located between the teeth of the first plurality of artificial teeth and a first fixed gingiva section of the first artificial gingiva with a first fixed geometrical form;
moving the first dental arch as a whole relative to the first fixed gingiva section in order to adjust the position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

46. A computer system for adjusting a position of artificial teeth of a denture, the computer system comprising a processor and a memory storing program instructions executable by the processor, execution of the program instructions by the processor causing the computer system to adjust the position of the first dental arch of the denture, the adjusting comprising:
providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
defining a first deformable gingiva section of the first artificial gingiva with a first deformable geometrical form, the first deformable gingiva section being located between the teeth of the first plurality of artificial teeth and a first fixed gingiva section of the first artificial gingiva with a first fixed geometrical form;
moving the first dental arch as a whole relative to the first fixed gingiva section in order to adjust the position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

47. The computer system of feature combination 46, wherein the execution of the program instructions by the processor further causes the computer system further to control a manufacturing device configured for manufacturing the denture using the digital 3D model with the first dental arch at the adjusted position and the first deformable gingiva section deformed due to the moving of the first dental arch.

48. The computer system of feature combination 47, the manufacturing device for manufacturing the denture comprising at least one of the following devices: a machining device and a 3D printer.

| List of reference numerals | |
|---|---|
| 10 | computer system |
| 11 | system |
| 14 | external device |
| 16 | processing unit |
| 18 | bus |
| 20 | network adapter |
| 22 | I/O interface |
| 24 | display |
| 28 | memory |
| 30 | RAM |
| 32 | cache |
| 34 | storage system |
| 40 | program |
| 42 | program module |
| 50 | user interface |
| 52 | control elements |
| 54 | hardware device |
| 56 | keyboard |
| 58 | mouse |
| 60 | 3D printing device |
| 62 | printing element |
| 70 | machining device |
| 72 | machining tool |
| 74 | holding device |
| 76 | blank |
| 78 | raw material |
| 100 | denture |
| 101 | maxillary denture part |
| 102 | fixed gingiva part |
| 104 | deformable gingiva part |
| 106 | boundary section |
| 108 | boundary |
| 109 | boundary |
| 110 | support surface |
| 112 | artificial gingiva |
| 114 | dental arch |
| 116 | artificial tooth |
| 118 | recess |
| 121 | mandibular denture part |
| 122 | fixed gingiva part |
| 124 | deformable gingiva part |
| 126 | boundary section |
| 128 | boundary |
| 129 | boundary |
| 132 | artificial gingiva |
| 134 | dental arch |
| 136 | artificial tooth |
| 138 | recess |
| 140 | occlusal plane |
| 141 | axis |
| 142 | articulator |
| 142 | incisal needle |

The invention claimed is:

1. A computer-implemented method for adjusting a position of artificial teeth of a denture, the adjusting comprising:
providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
defining a first deformable gingiva section of the first artificial gingiva with a first deformable geometrical form, the first deformable gingiva section being located between teeth of the first plurality of artificial teeth and a first fixed gingiva section of the first artificial gingiva with a first fixed geometrical form; and
moving the first dental arch as a whole relative to the first fixed gingiva section in order to adjust a position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

2. The method of claim 1, wherein the first denture part is a maxillary or a mandibular denture part.

3. The method of claim 1, wherein the first deformable gingiva section connects the first fixed gingiva section with one or more first boundary lines arranged at fixed positions at the teeth of the first plurality of artificial teeth, a form and position of the first boundary lines relative to the teeth of the first plurality of artificial teeth being maintained, when moving the first dental arch.

4. The method of claim 3, the first deformable gingiva section in contact with the teeth of the first plurality of artificial teeth, each of the first boundary lines defining a first contact line extending around one of the teeth of the first plurality of artificial teeth.

5. The method of claim 3, the one or more first boundary lines arranged spaced apart from the teeth of the first plurality of artificial teeth defining a clearance around each of the teeth of the first plurality of artificial teeth.

6. The method of claim 1, wherein the first deformable gingiva section connects the first fixed gingiva section with a first boundary gingiva section of the first gingiva, the first boundary gingiva section extending around teeth of the first plurality of artificial teeth, the first connection gingiva section configured to move together with the first dental arch, the first connection gingiva section maintaining a fixed third geometrical form and a fixed position relative to the teeth of the first plurality of artificial teeth.

7. The method of claim 6, wherein the first boundary gingiva section in contact with the teeth of the first plurality of artificial teeth, the first boundary gingiva section connecting the teeth of the first plurality of artificial teeth, which are arranged within the first connection gingiva section, with the first deformable gingiva section.

8. The method of claim 6, wherein the first boundary gingiva section spaced apart from the teeth of the first plurality of artificial teeth defining a clearance around each of the teeth of the first plurality of artificial teeth.

9. The method of claim 6, the first deformable gingiva section forming a closed loop extending around the first boundary gingiva section with the first plurality of artificial teeth.

10. The method of claim 1, the deforming of the first deformable geometrical form of the first deformable gingiva section executed during the moving of the first dental arch.

11. The method of claim 1, the deforming of the first deformable geometrical form of the first deformable gingiva section executed after the moving of the first dental arch.

12. The method of claim 1, the moving of the first dental arch comprising a translation along a straight translation vector.

13. The method of claim 1, the moving of the first dental arch comprising a rotation around an axis of rotation.

14. The method of claim 13, the axis of rotation extending through bilateral temporomandibular joints of the patient.

15. The method of claim 1, the deforming of the first deformable gingiva section comprising a smoothing of a surface of the first deformable gingiva section providing a smooth transition from a surface of the first fixed gingiva section to the surface of the first deformable gingiva section.

16. The method of claim 15, the smoothing of the surface of the first deformable gingiva section further providing a smooth surface connecting the surface of the first fixed gingiva section with the first boundary lines.

17. The method of claim 15, the smoothing of the surface of the first deformable gingiva section further providing a smooth transition from the surface of the first fixed gingiva section to the surface of the first boundary gingiva section.

18. The method of claim 15, the smoothing comprises recalculating a form of the surface of the first deformable gingiva section.

19. The method of claim 1, the digital 3D model of the denture further comprising a second denture part, the second denture part being configured for a second jaw of a patient, the first denture part being a maxillary denture part and the second denture part being a mandibular denture part, the second denture part comprising a second dental arch, the second dental arch comprising a second plurality of artificial teeth to be adjusted, the second plurality of artificial teeth being arranged in a second artificial gingiva, wherein the adjusting further comprises:
   defining a second deformable gingiva section of the second artificial gingiva with a second deformable geometrical form, the second deformable gingiva section being located between the teeth of the second plurality of artificial teeth and a second fixed gingiva section of the second artificial gingiva with a second fixed geometrical form; and
   moving the second dental arch as a whole relative to the second fixed gingiva section in order to adjust the position of the second dental arch with the teeth of the second plurality of artificial teeth maintaining fixed positions relative to each other, the second deformable geometrical form of the second deformable gingiva section being deformed due to the moving of the second dental arch, whereas the second fixed gingiva section maintains the second fixed geometrical form.

20. The method of claim 19, wherein the first and second dental arch are moved in combination as a whole with the teeth of the first plurality of artificial teeth maintaining fixed positions relative to the teeth of the second plurality of artificial teeth.

21. The method of claim 20, wherein the first and second dental arch are arranged in occlusion, while being moved.

22. The method of claim 20, the moving of the first and second dental arch in combination as a whole comprises a translation of the combination along a common straight translation vector.

23. The method of claim 20, the moving of the first and second dental arch comprising a rotation of the combination around a common axis of rotation in a same rotating direction.

24. The method of claim 19, the moving of the first and second dental arch comprising a rotation of the first and second dental arch around a common axis of rotation in opposite rotating direction.

25. The method of claim 19, the second deformable gingiva section connecting the second fixed gingiva section with one or more second boundary lines arranged at fixed positions at the teeth of the second plurality of artificial teeth, a form and position of the second boundary lines relative to the teeth of the second plurality of artificial teeth being maintained, when moving the second dental arch.

26. The method of claim 25, the second deformable gingiva section in contact with the teeth of the second plurality of artificial teeth, each of the second boundary lines defining a second contact line extending around one of the teeth of the second plurality of artificial teeth.

27. The method of claim 25, the one or more second boundary lines arranged spaced apart from the teeth of the second plurality of artificial teeth defining a clearance around each of the teeth of the second plurality of artificial teeth.

28. The method of claim 19, wherein the second deformable gingiva section connects the second fixed gingiva section with a second boundary gingiva section of the second gingiva, the second boundary gingiva section extending around teeth of the second plurality of artificial teeth, the second boundary gingiva section configured to move together with the second dental arch, the second boundary gingiva section maintaining a fixed fourth geometrical form and a fixed position relative to the teeth of second plurality of artificial teeth.

29. The method of claim 28, wherein the second boundary gingiva section in contact with the teeth of the second plurality of artificial teeth, the second boundary gingiva section connecting the teeth of the second plurality of artificial teeth, which are arranged within the second boundary gingiva section, with the second deformable gingiva section.

30. The method of claim 28, wherein the second boundary gingiva section spaced apart from the teeth of the second plurality of artificial teeth defining a clearance around each of the teeth of the second plurality of artificial teeth.

31. The method of claim 28, the second deformable gingiva section forming a closed loop extending around the second boundary gingiva section with the second plurality of artificial teeth.

32. The method of claim 19, the deforming of the second deformable geometrical form of the second deformable gingiva section executed during the moving of the second dental arch.

33. The method of claim 19, the deforming of the second deformable geometrical form of the second deformable gingiva section executed after the moving of the second dental arch.

34. The method of claim 19, the deforming of the second deformable geometrical form of the second deformable gingiva section comprising a smoothing of a surface of the second deformable gingiva section providing a smooth transition from a surface of the second fixed gingiva section to the surface of the second deformable gingiva section.

35. The method of claim 34, the smoothing of the surface of the second deformable gingiva section further providing a smooth surface connecting the surface of the second fixed gingiva section with the second boundary lines.

36. The method of claim 34, the smoothing of the surface of the second deformable gingiva section further providing a smooth transition from the surface of the second fixed gingiva section to the surface of the second boundary gingiva section.

37. The method of claim 34, the smoothing comprising recalculating a form of the surface of the second deformable gingiva section.

38. The method of claim 19, the providing of the digital 3D model of the denture comprising selecting a set of artificial teeth from a tooth library comprising a plurality of sets of artificial teeth, the selected set of artificial teeth comprising the first and second plurality of artificial teeth.

39. The method of claim 38, the first and second plurality of artificial teeth of the selected set providing a pre-defined occlusion.

40. The method of claim 19, the providing of the digital 3D model of the denture comprising selecting a set of artificial gingivas from a gingiva library comprising a plurality of sets of artificial gingivas, each of the sets of artificial gingivas comprising a maxillary and a mandibular artificial gingiva.

41. The method of claim 1, the providing of the digital 3D model of the denture comprising selecting a set of teeth from a tooth library comprising a plurality of sets of teeth, the selected set of teeth comprising the first plurality of artificial teeth.

42. The method of claim 1, the providing of the digital 3D model of the denture comprising selecting the first artificial gingiva from a gingiva library comprising a plurality of artificial gingivas.

43. The method of claim 1, the method further comprising manufacturing the denture using the digital 3D model with the first dental arch arranged at the adjusted position and the first deformable gingiva section deformed due to the moving of the first dental arch.

44. The method of claim 43, the manufacturing of the denture comprising using at least one of the following devices: a machining device and a 3D printer.

45. A computer program product for adjusting a position of artificial teeth of a denture, the computer program product comprising a non-transitory computer readable storage medium having program instructions embodied therewith, the program instructions being executable by a processor of a computer system to cause the computer system to adjust the position of the artificial teeth of the denture, the adjusting comprising:
   providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
   defining a first deformable gingiva section of the first artificial gingiva with a first deformable geometrical form, the first deformable gingiva section being located between teeth of the first plurality of artificial teeth and a first fixed gingiva section of the first artificial gingiva with a first fixed geometrical form; and
   moving the first dental arch as a whole relative to the first fixed gingiva section in order to adjust a position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

46. A computer system for adjusting a position of artificial teeth of a denture, the computer system comprising a processor and a memory storing program instructions executable by the processor, execution of the program instructions by the processor causing the computer system to adjust the position of the artificial teeth of the denture, the adjusting comprising:
   providing a digital 3D model of the denture comprising at least a first denture part, the first denture part being configured for a first jaw of a patient, the first denture part comprising a first dental arch, the first dental arch comprising a first plurality of artificial teeth to be adjusted, the first plurality of artificial teeth being arranged in a first artificial gingiva;
   defining a first deformable gingiva section of the first artificial gingiva with a first deformable geometrical form, the first deformable gingiva section being located between teeth of the first plurality of artificial teeth and a first fixed gingiva section of the first artificial gingiva with a first fixed geometrical form; and
   moving the first dental arch as a whole relative to the first fixed gingiva section in order to adjust a position of the first dental arch with the teeth of the first plurality of artificial teeth maintaining fixed positions relative to each other, the first deformable geometrical form of the first deformable gingiva section being deformed due to the moving of the first dental arch, whereas the first fixed gingiva section maintains the first fixed geometrical form.

47. The computer system of claim 46, wherein the execution of the program instructions by the processor further causes the computer system further to control a manufacturing device configured for manufacturing the denture using the digital 3D model with the first dental arch at the adjusted position and the first deformable gingiva section deformed due to the moving of the first dental arch.

48. The computer system of claim 47, the manufacturing device for manufacturing the denture comprising at least one of the following devices: a machining device and a 3D printer.

* * * * *